(12) United States Patent
Zhang

(10) Patent No.: US 12,329,316 B1
(45) Date of Patent: Jun. 17, 2025

(54) TEMPERATURE CONTROL SYSTEM FOR GRILL, MAIN UNIT, AND FAN

(71) Applicant: Ren Zhang, Beijing (CN)

(72) Inventor: Ren Zhang, Beijing (CN)

( * ) Notice: Subject to any disclaimer, the term of this patent is extended or adjusted under 35 U.S.C. 154(b) by 0 days.

(21) Appl. No.: 18/976,672

(22) Filed: Dec. 11, 2024

(30) Foreign Application Priority Data

Nov. 19, 2024 (CN) .......................... 202411658554.0
Nov. 27, 2024 (CN) .......................... 202422909402.5

(51) Int. Cl.
| | |
|---|---|
| *A47J 37/07* | (2006.01) |
| *A47J 36/32* | (2006.01) |
| *F04D 25/12* | (2006.01) |
| *F23N 3/08* | (2006.01) |
| *F24B 5/02* | (2006.01) |
| *G08C 17/02* | (2006.01) |

(52) U.S. Cl.
CPC ......... *A47J 37/0786* (2013.01); *A47J 36/321* (2018.08); *A47J 37/0754* (2013.01); *F04D 25/12* (2013.01); *F23N 3/082* (2013.01); *F24B 5/021* (2013.01); *A47J 2202/00* (2013.01); *F23N 2225/08* (2020.01); *G08C 17/02* (2013.01)

(58) Field of Classification Search
CPC .. A47J 37/0786; A47J 36/321; A47J 37/0754; A47J 2202/00; F04D 25/12; F23N 3/082; F23N 2225/08; F24B 5/021; G08C 17/02
See application file for complete search history.

(56) References Cited

U.S. PATENT DOCUMENTS

| | | | | |
|---|---|---|---|---|
| 1,869,242 | A * | 7/1932 | Frame ........................ | F23D 5/00 |
| | | | | 431/189 |
| 2,950,669 | A * | 8/1960 | Terry ................... | A47J 37/0754 |
| | | | | 137/625.45 |
| 3,339,831 | A * | 9/1967 | Ranz ...................... | F04D 29/424 |
| | | | | 415/206 |
| 6,850,861 | B1 * | 2/2005 | Faiola ..................... | G01K 1/026 |
| | | | | 374/E1.005 |
| 7,075,442 | B2 * | 7/2006 | Lion ...................... | G01K 1/024 |
| | | | | 374/E1.004 |
| 8,800,542 | B1 * | 8/2014 | Kennington .......... | F24B 15/005 |
| | | | | 99/333 |
| 8,931,400 | B1 * | 1/2015 | Allen ................... | A47J 37/0786 |
| | | | | 99/344 |
| 10,909,979 | B1 * | 2/2021 | Chu ........................ | G08B 3/10 |

(Continued)

FOREIGN PATENT DOCUMENTS

CN 210941277 U * 7/2020

*Primary Examiner* — Michael G Hoang
*Assistant Examiner* — Logan P Jones

(57) ABSTRACT

A temperature control system for a grill, including a main unit and a fan. The main unit is configured to be mounted on the grill, and the fan is positioned corresponding to the intake port of the grill to adjust the intake volume for controlling fuel combustion. The main unit and the fan are in communication. The main unit includes a control module and a temperature measurement module. The temperature measurement module is used to detect the air ambient temperature of the grill and transmit a first temperature signal to the control module. The control module is configured to control the power of the fan or its on/off state based on the first temperature signal.

18 Claims, 21 Drawing Sheets

(56) References Cited

U.S. PATENT DOCUMENTS

| | | | | |
|---|---|---|---|---|
| 2004/0226454 | A1* | 11/2004 | Pirkle | A47J 36/321 |
| | | | | 99/476 |
| 2007/0221655 | A1* | 9/2007 | Bridgwater | A47J 37/0871 |
| | | | | 219/494 |
| 2008/0259995 | A1* | 10/2008 | Kuhn | G01K 7/32 |
| | | | | 374/E1.004 |
| 2013/0061765 | A1* | 3/2013 | Reinhart | F24C 15/001 |
| | | | | 236/49.5 |
| 2013/0206015 | A1* | 8/2013 | Jacoby | A47J 37/07 |
| | | | | 99/330 |
| 2016/0377490 | A1* | 12/2016 | Nivala | G01K 7/42 |
| | | | | 374/155 |
| 2017/0348654 | A1* | 12/2017 | Ghazarian | B06B 1/16 |
| 2020/0096393 | A1* | 3/2020 | Lion | G01K 3/10 |
| 2020/0129006 | A1* | 4/2020 | Nivala | G08B 21/24 |
| 2020/0178727 | A1* | 6/2020 | Brennan | A47J 37/0786 |
| 2021/0356104 | A1* | 11/2021 | Thorne | H01M 50/262 |
| 2022/0087475 | A1* | 3/2022 | Terrell | A23B 4/052 |

\* cited by examiner

TEMPERATURE CONTROL SYSTEM FOR GRILL, MAIN UNIT, AND FAN

CROSS-REFERENCE TO RELATED APPLICATIONS

The present invention claims priority of Chinese patent application CN2024116585540, filed on Nov. 19, 2024, and Chinese Patent Application No. 2024229094025, filed on Nov. 27, 2024, which are incorporated herein by reference in its entireties.

TECHNICAL FIELD

The present invention relates to the field of temperature monitoring, particularly a temperature control system for a grill, including the main unit and fan.

BACKGROUND

A grill is an essential tool for cooking grilled food, especially meat, and has become increasingly popular among consumers. When the temperature is insufficient, meat may remain undercooked, affecting its flavor; conversely, when the temperature is too high, the meat can become burnt and produce toxic substances. Grills equipped with temperature monitoring systems help users track the air ambient temperature of the grill, enabling better temperature control and improved food quality.

However, most existing grills with temperature monitoring use wired connections between thermometers and fans for temperature regulation, resulting in messy wiring and inconvenience during use. Additionally, fuel-based grills require manual adjustments to airflow or fuel levels, which can be labor-intensive.

In response to these challenges, the present invention provides a temperature control system for a grill, designed to effectively address the aforementioned problems.

SUMMARY

To overcome the shortcomings of the existing technology, the technical solution adopted by the present invention to solve its technical problem is as follows:

A temperature control system for a grill, including a main unit and a fan. The main unit is configured to be mounted on the grill, and the fan is positioned corresponding to the intake port of the grill to adjust the intake volume for controlling fuel combustion. The main unit and the fan are in communication. The main unit includes a control module and a temperature measurement module. The temperature measurement module is used to detect the air ambient temperature of the grill and transmit a first temperature signal to the control module. The control module is configured to control the power of the fan or its on/off state based on the first temperature signal.

Furthermore, the temperature control system for the grill also includes a probe thermometer, which is wirelessly connected to the main unit. The probe thermometer is used to be inserted into the food inside the grill to detect both the temperature of the food and the air ambient temperature of the grill, transmitting a food temperature signal and a grill temperature signal to the control module. The control module is also configured to control the power of the fan or its on/off state based on the food temperature signal and/or the grill temperature signal.

Further, the temperature measurement module includes a first housing, on which a raised base is provided. The side wall of the base is equipped with a latch block. The control module includes a second housing, and the side wall of the second housing is provided with a sliding groove that cooperates with the latch block. The sliding groove includes an opening and a fixed end. The second housing is positioned within the base, with the latch block aligned with the sliding groove. The latch block enters the sliding groove from the opening, and by rotating the second housing, the latch block slides to the fixed end, locking the second housing with the first housing. Rotating the second housing causes the latch block to slide out from the opening, thus detaching the second housing from the first housing.

Furthermore, the temperature measurement module also includes an anti-slip pad, the anti-slip pad is arranged on the inner side of the base, and when the second housing is placed within the base, the second housing abuts against the anti-slip pad.

Furthermore, the temperature measurement module also includes a first signal reception board arranged inside the first housing, a plurality of first pogo pins connected with the first signal reception board and a first temperature sensor which is used to monitor the temperature. One end of the first temperature sensor is fixedly connected with the first housing, and the other end of the first temperature sensor is arranged on the outer side of the first housing. The first temperature sensor is electrically connected to the first signal reception board. In addition, the control module also includes a plurality of second pogo pins, and after the second housing is locked with the first housing, the second pogo pins abut against the first pogo pins; and the first temperature sensor is made of a platinum resistance material.

Furthermore, the first temperature sensor is equipped with a screw thread, and the temperature measurement module also includes a nut matched with the screw thread, which can cooperate with the screw thread to fix the first temperature sensor on the external hole site.

Furthermore, the control module also includes a second signal reception board arranged inside the second housing, the second pogo pin is electrically connected to the second signal reception board, and the second signal reception board is configured to receive the first temperature signal. Then, the control module further includes a first control main board and a first battery arranged inside the second housing, the first control main board is electrically connected to the first battery for supplying the power to the first control main board. Meanwhile, the second signal reception board is electrically connected to the first control main board, and the second signal reception board transmits the first temperature signal to the first control main board.

Furthermore, the first control main board includes an MCU, a first wireless communication module, a second wireless communication module, a charging management circuit, a flash IC, and a voltage stabilizing circuit. The MCU is electrically connected to the first wireless communication module, the second wireless communication module, the flash IC, and the voltage stabilizing circuit respectively, and the charging management circuit is electrically connected to the voltage stabilizing circuit. Then, the MCU is configured to wirelessly communicate with the fan or the probe thermometer through the first wireless communication module, and the MCU is also configured to communicate with the mobile terminal through the second wireless communication module to transmit the working status and information of the main unit, the working status and information of the fan, and/or the working status and information of the probe thermometer to the mobile terminal. The first wireless communication module is a Bluetooth module, and the second wireless communication module is a WiFi module.

Furthermore, the control module also includes a first charging circuit board and a reset button arranged inside the second housing, as well as a first power interface arranged on the second housing. The first power interface and the reset button are electrically connected to the first charging circuit board respectively, and the first charging circuit board is electrically connected to the first control main board.

Furthermore, the fan includes a third housing and a wireless signal board arranged inside the third housing, and the wireless signal board is configured to receive the wireless signal from the main unit.

Furthermore, the fan also includes a second control main board arranged inside the third housing, a second power switch and a second power interface arranged on the third housing. The wireless signal board, the second power switch and the second power interface are electrically connected to the second control main board respectively. The second control main board is configured to control the power of the fan and its on/off state. In addition, the fan is externally connected to a 5V2A power adapter.

Furthermore, the fan also includes a fan blade arranged inside the third housing. The third housing is equipped with an accommodating groove, an air duct and an air outlet. Specifically, the accommodating groove, the air duct and the air outlet are connected in sequence, and the fan blade is arranged inside the accommodating groove.

Furthermore, a protruding shaft is arranged inside the accommodating groove, a first shaft hole is arranged on the protruding shaft, a first rotating shaft is arranged on the fan blade, and the first rotating shaft is configured to rotate within the first shaft hole.

Furthermore, an opening is arranged at a position corresponding to the fan blade on the third housing, the opening is configured to allow air to enter the third housing. The third housing also includes a first baffle plate and a second baffle plate. The second baffle plate is mounted at the opening, and a second ventilation opening is arranged on the second baffle plate. The first baffle plate is rotatably connected to the second baffle plate, and a first ventilation opening is arranged on the first baffle plate.

Furthermore, the first baffle plate is equipped with a second rotating shaft, one end of the second rotating shaft is equipped with a latch block, and the second baffle plate is equipped with a second shaft hole. The second rotating shaft is rotatably arranged within the second shaft hole, and the latch block is clamped on the outer side of the second shaft hole to prevent the second rotating shaft from falling out of the second shaft hole.

Furthermore, a plurality of first protruding strips are arranged on the first baffle plate surrounding the second rotating shaft, and correspondingly, a plurality of protruding dots are arranged on the second baffle plate surrounding the second shaft hole. When the first baffle plate abuts against the second baffle plate, the protruding dot can be clamped in a gap of the first protruding strip to prevent the first baffle plate and the second baffle plate from rotating relatively. Meanwhile a plurality of second protruding strips are arranged on an outer side wall of the first baffle plate.

Furthermore, the fan also includes a horizontal bar and an elastic member arranged at the air outlet. Two ends of the horizontal bar are detachably connected to the side wall at the air outlet, and the elastic member is rotatably arranged on the horizontal bar. The elastic member includes two supporting rods and a spring portion, and the two supporting rods have an opening and closing angle between them.

Furthermore, the probe thermometer includes a fourth housing, and the fourth housing includes a flat holding end and a slender temperature measuring end. The probe thermometer also includes a thermocouple grill temperature sensor, an antenna connector, a waterproof sealing ring, a third control main board, a flexible circuit board, a digital temperature sensor and a second battery arranged inside the fourth housing respectively. The thermocouple grill temperature sensor, the antenna connector and the flexible circuit board are connected respectively to the third control main board, the digital temperature sensor is arranged on one end of the flexible circuit board, and the second battery is electrically connected to the third control main board. Specifically, the second battery is configured to supply the power to the third control main board, the digital temperature sensor is configured to measure the temperature of the food of the grill, the thermocouple grill temperature sensor is configured to measure the air ambient temperature of the grill. The digital temperature sensor transmits the food temperature of the grill to the third control main board, and the thermocouple grill temperature sensor transmits the air ambient temperature of the grill to the third control main board. The third control main board converts the temperature of the food of the grill and the air ambient temperature of the grill into the food temperature signal and the grill temperature signal, and the food temperature signal and the grill temperature signal are wirelessly transmitted to the main unit via the antenna connector.

Furthermore, the control module also includes a display screen, a first button, a second button, a third button and a fourth button arranged on the second housing respectively. The display screen, the first button, the second button, the third button and the fourth button are electrically connected to the first control main board respectively. Specifically, the display screen is configured to display temperature information, the first button is configured to control the power on and off of the main unit, the second button is configured to control the on/off state of the fan, the third button is configured to switch the temperature display unit on the display screen, and the fourth button is configured to control switching between the temperature signal of the probe thermometer and the temperature signal of the temperature measurement module on the display screen.

The present invention also provides a main unit for a temperature control system of a grill, the main unit is configured to be mounted on the grill, and the fan is positioned corresponding to the intake port of the grill to adjust the intake volume for controlling fuel combustion. The main unit and the fan are in communication. The main unit includes a control module and a temperature measurement module. The temperature measurement module is configured to detect the air ambient temperature of the grill and transmit a first temperature signal to the control module. The control module is configured to control the power of the fan or its on/off state based on the first temperature signal.

The present invention also provides a fan for a temperature control system of a grill, the fan is positioned corresponding to the intake port of the grill to adjust the intake volume for controlling fuel combustion. Then, the fan and the main unit are in communication either by wired means or by wireless means. The main unit is configured to get the air ambient temperature of the grill and control the power of the fan or its on/off state based on the air ambient temperature of the grill.

The beneficial effects of the temperature control system for the grill provided by the present invention are as follows: The temperature control system enables the main unit to detect the air ambient temperature in the grill in real time. This temperature control system also includes a probe thermometer that can be inserted into the food, which can detect the temperature of the food in the grill more accurately and transmit the temperature signal wirelessly to the main unit. Then, the main unit adjusts the rotating speed of the fan through the wireless signal, enabling the fan to blow air to the fuel inside the grill more intelligently to raise the air ambient temperature of the grill.

Moreover, the temperature control system for the grill is wirelessly connected to the mobile terminal, providing convenience for users.

BRIEF DESCRIPTION OF THE DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

The present invention is further described below in detail in combination with the accompanying drawings and embodiments.

Figure 1:
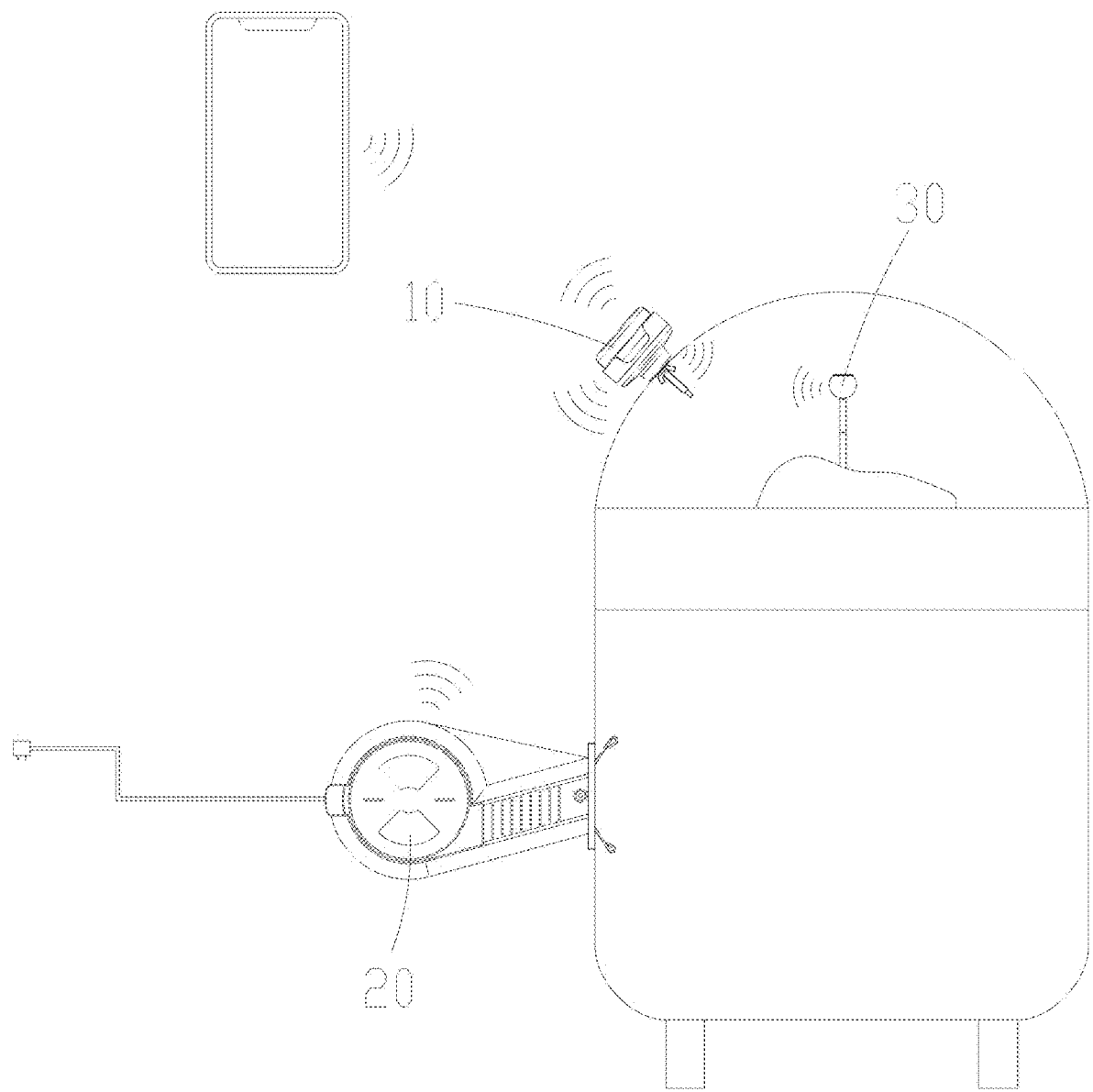
FIG. 1 is a schematic diagram of a temperature control system for a grill in a working status according to Embodiment I.
Figure 2:
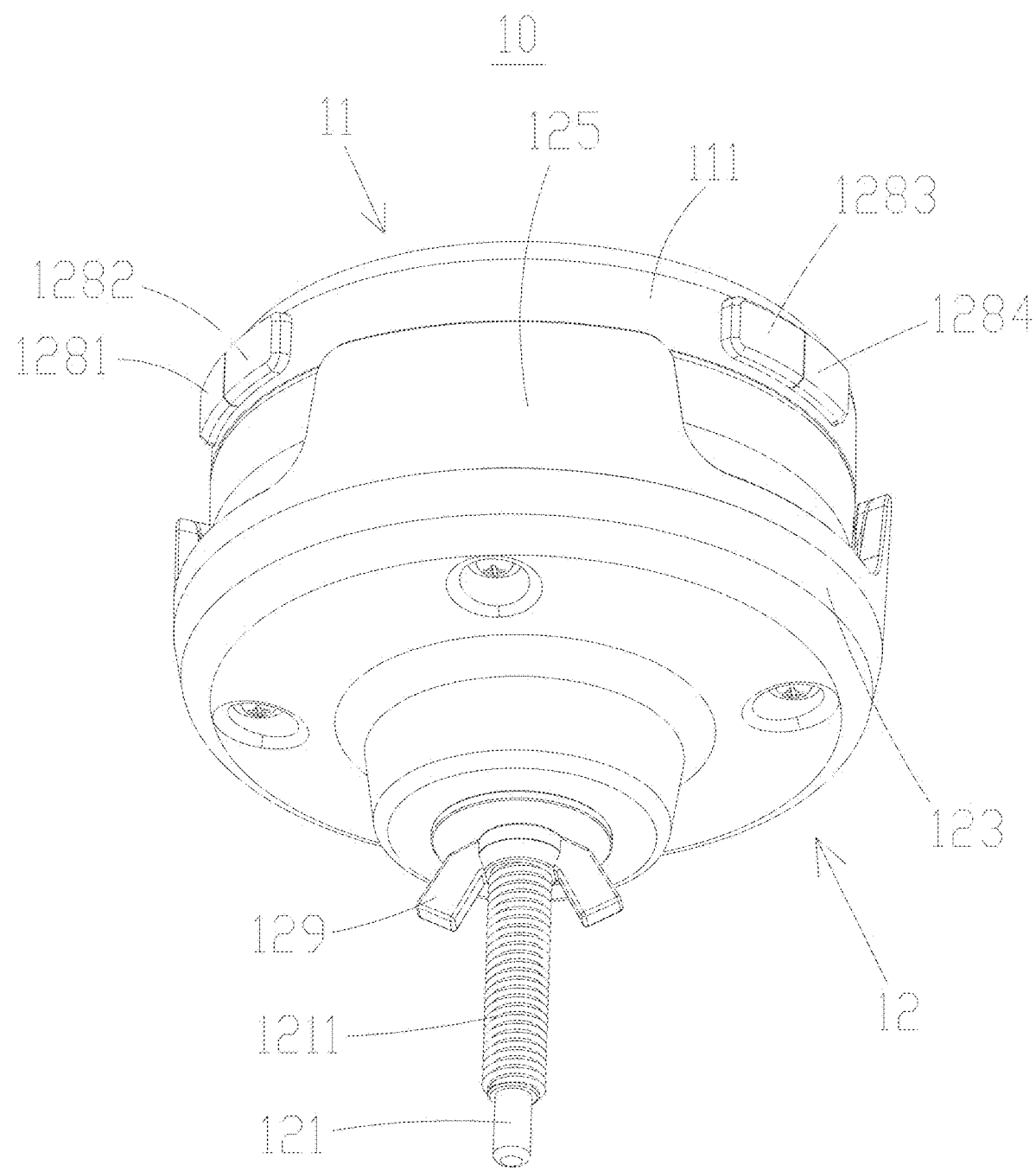
FIG. 2 is a schematic diagram of a 3D structure of a main unit.
Figure 3:
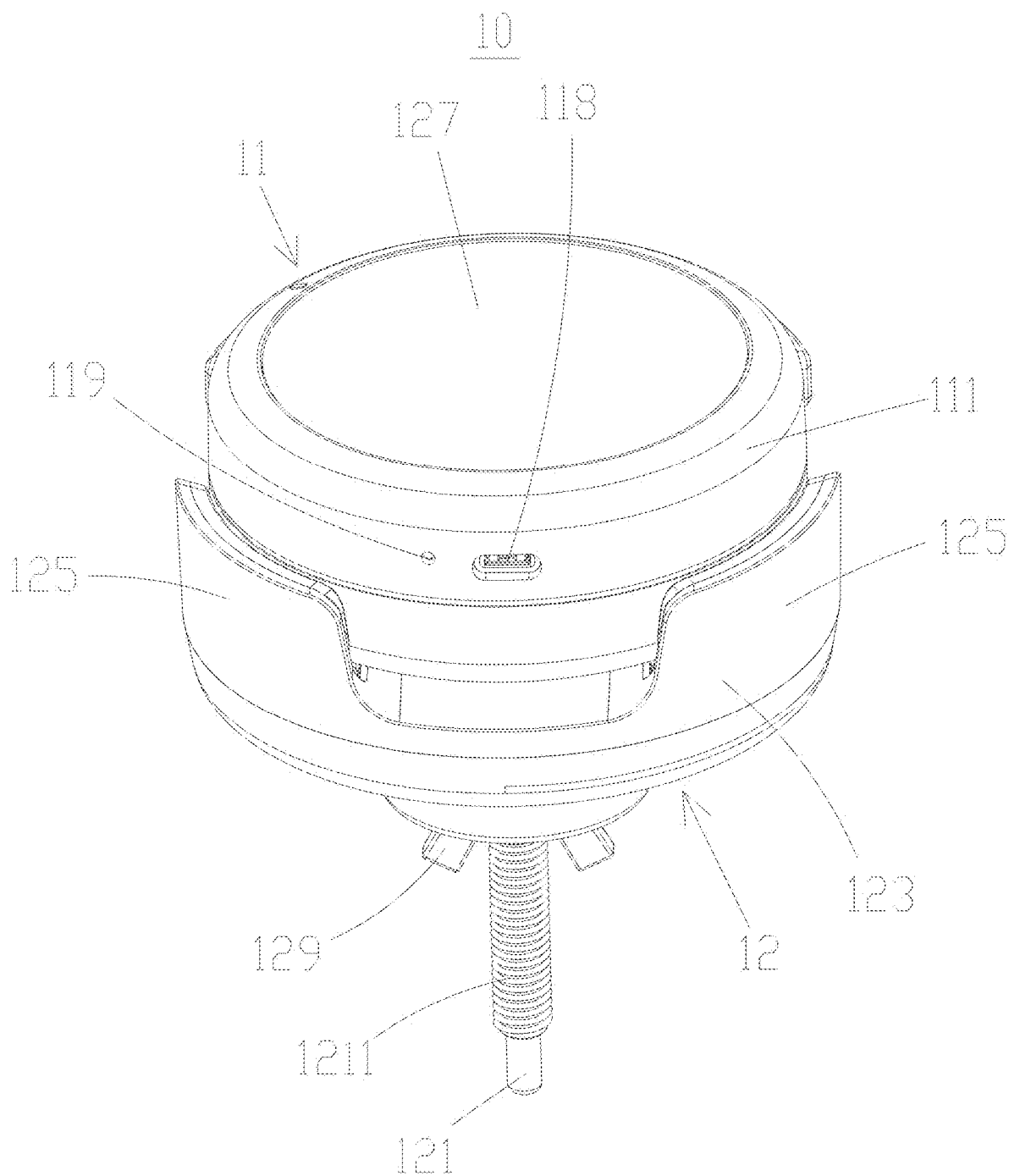
FIG. 3 is a schematic diagram of a 3D structure of the main unit from another viewing angle.
Figure 4:
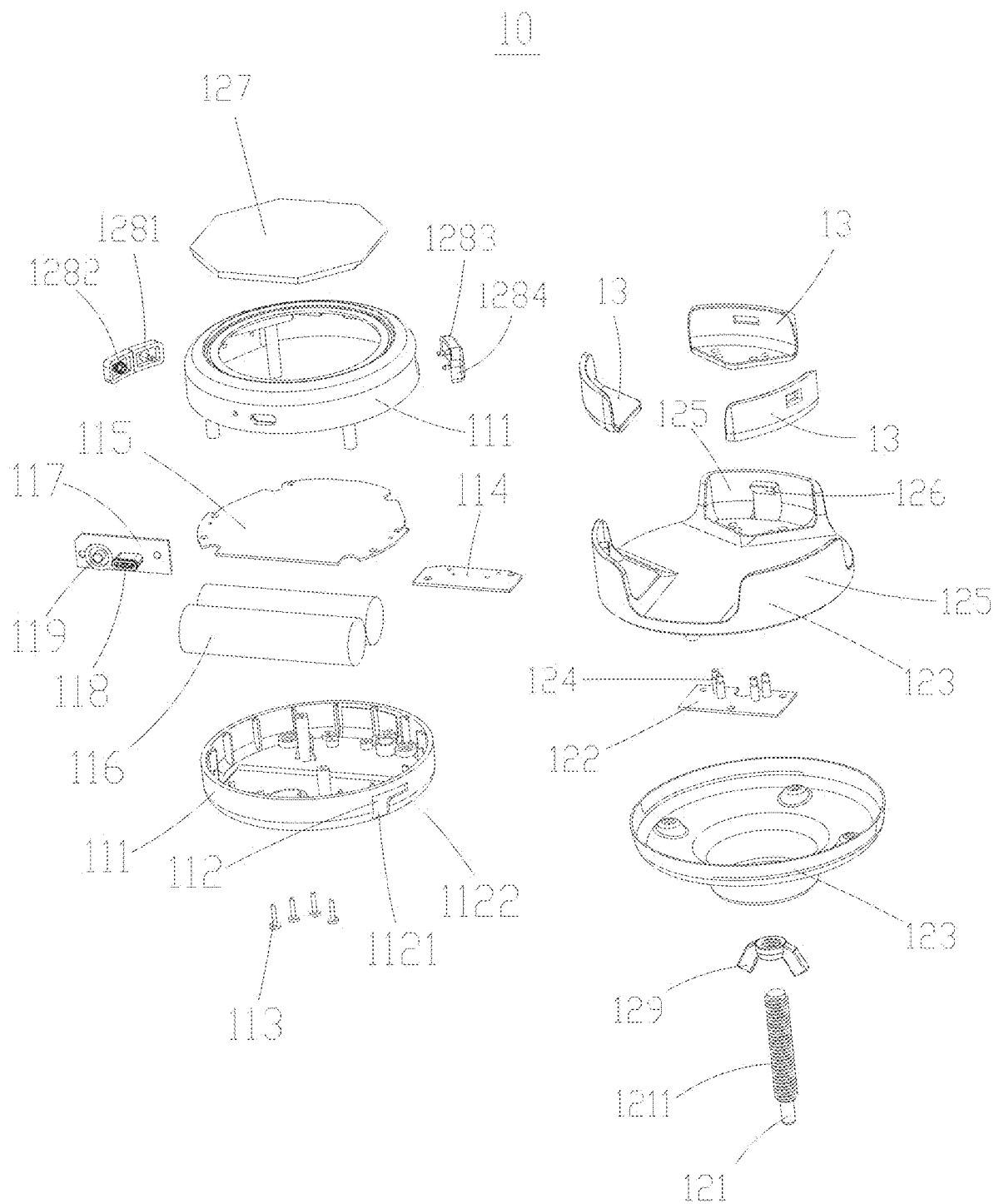
FIG. 4 is an exploded view diagram of the main unit.
Figure 5:
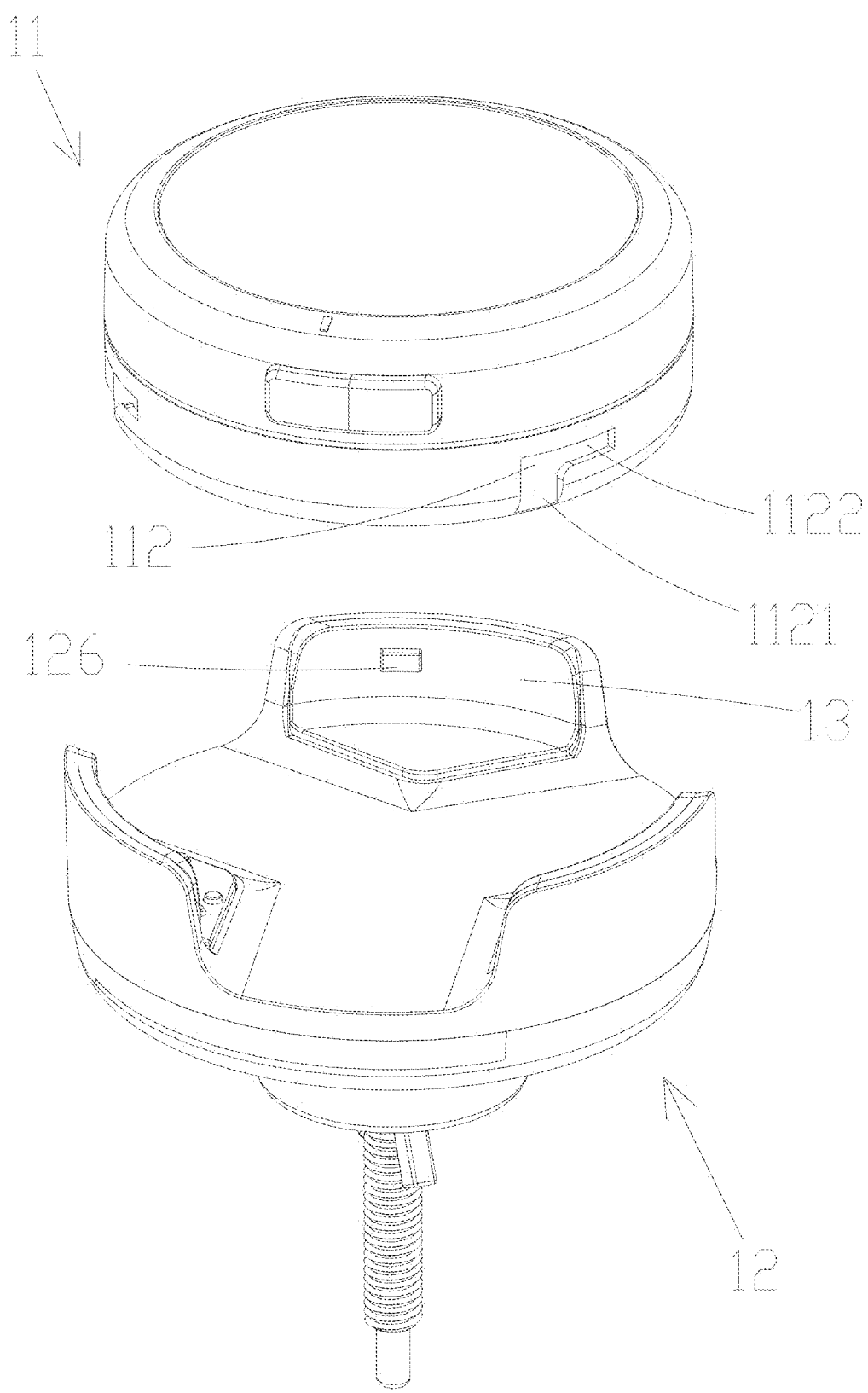
FIG. 5 is another exploded view diagram of the main unit.
Figure 6:
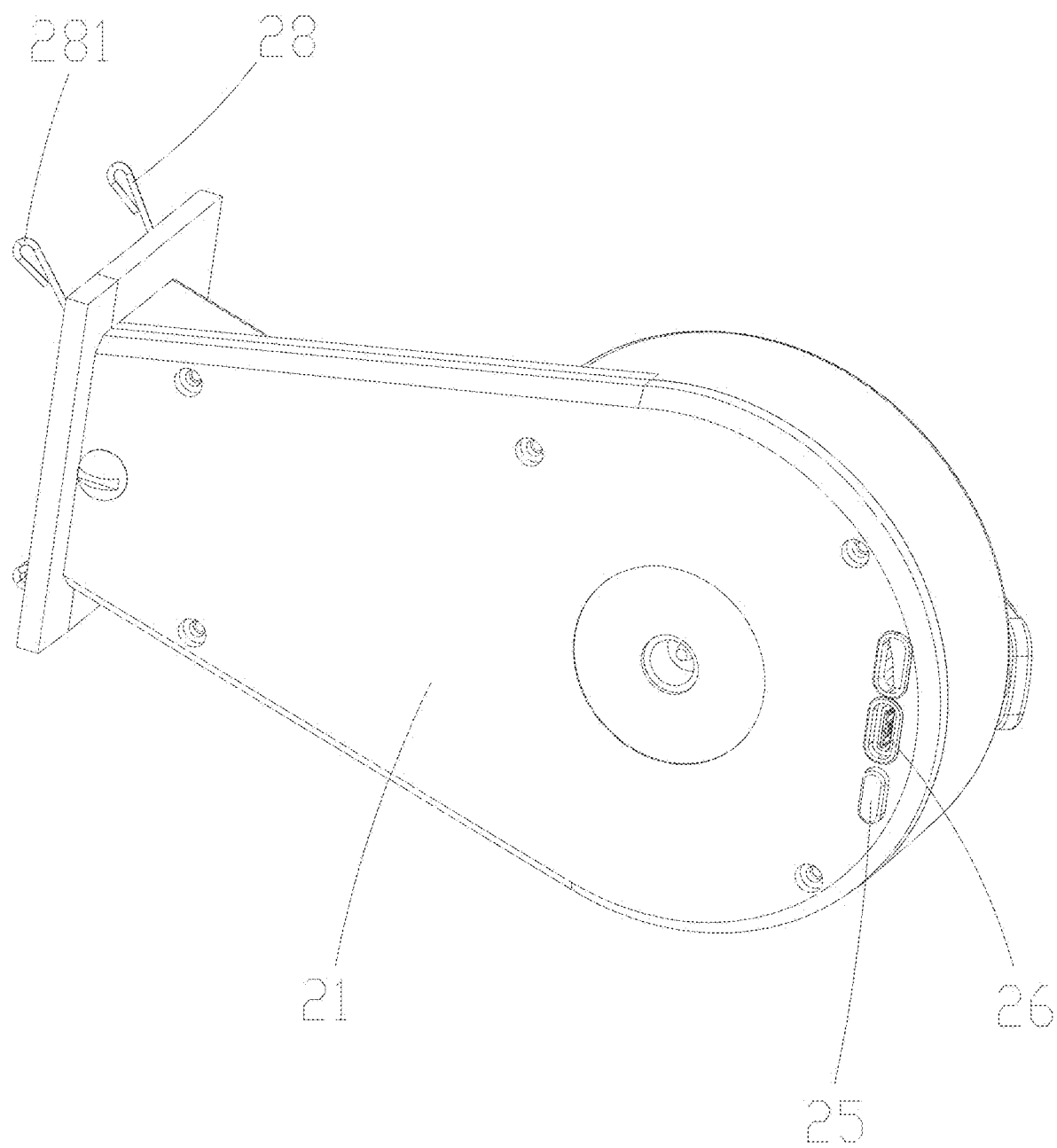
FIG. 6 is a schematic diagram of a 3D structure of a fan.
Figure 7:
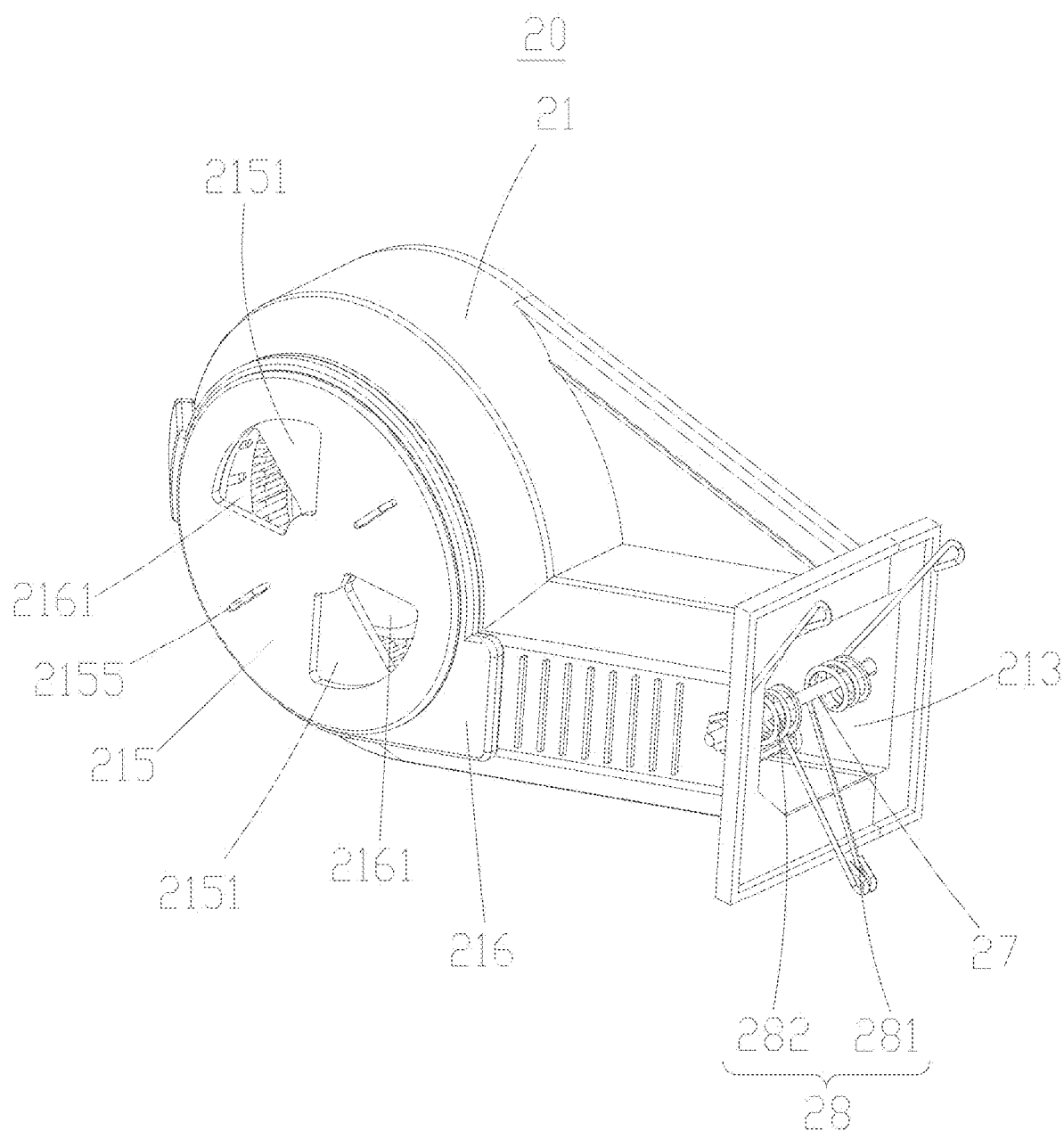
FIG. 7 is a schematic diagram of a 3D structure of the fan from another viewing angle.
Figure 8:
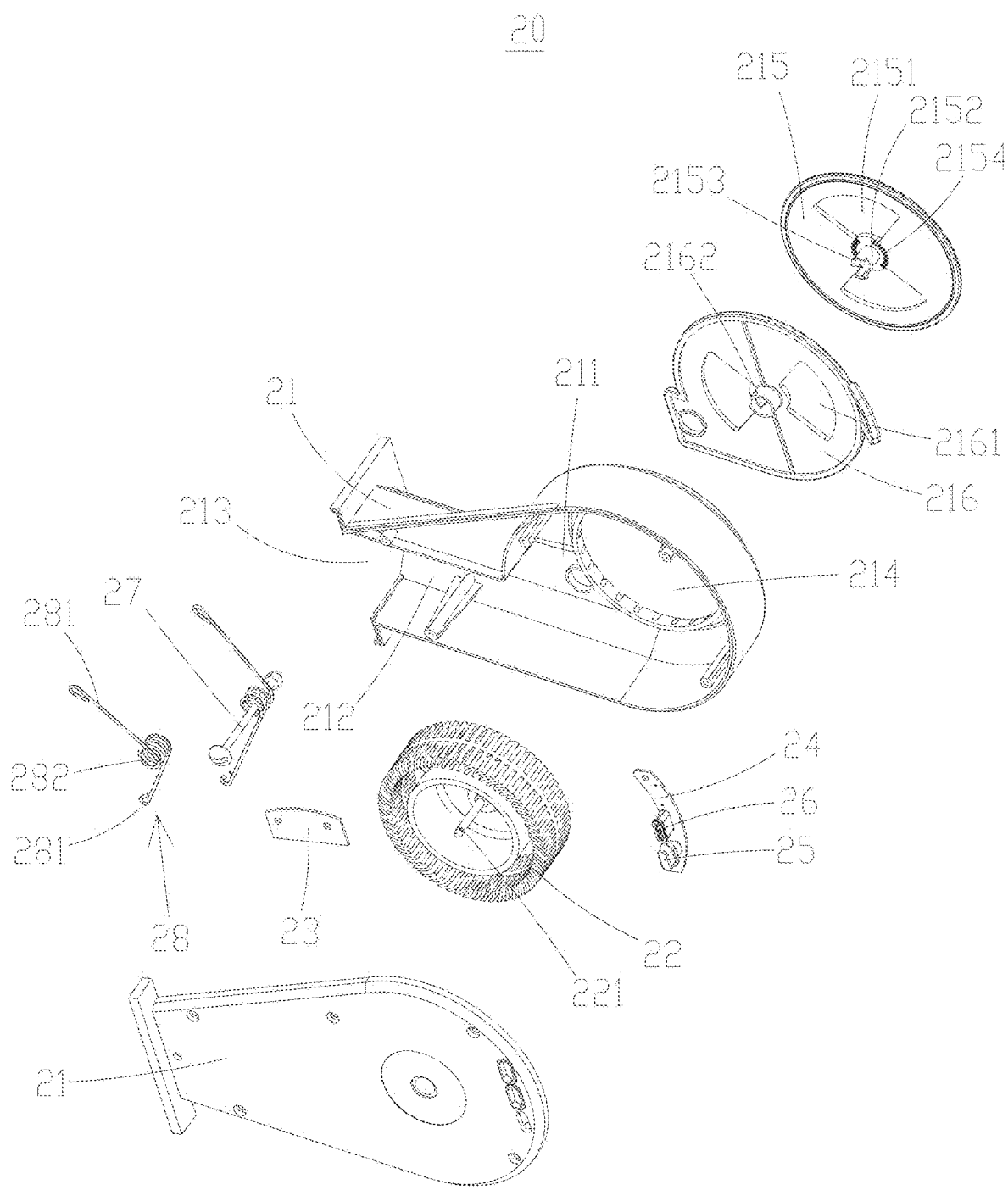
FIG. 8 is an exploded view diagram of the fan.
Figure 9:
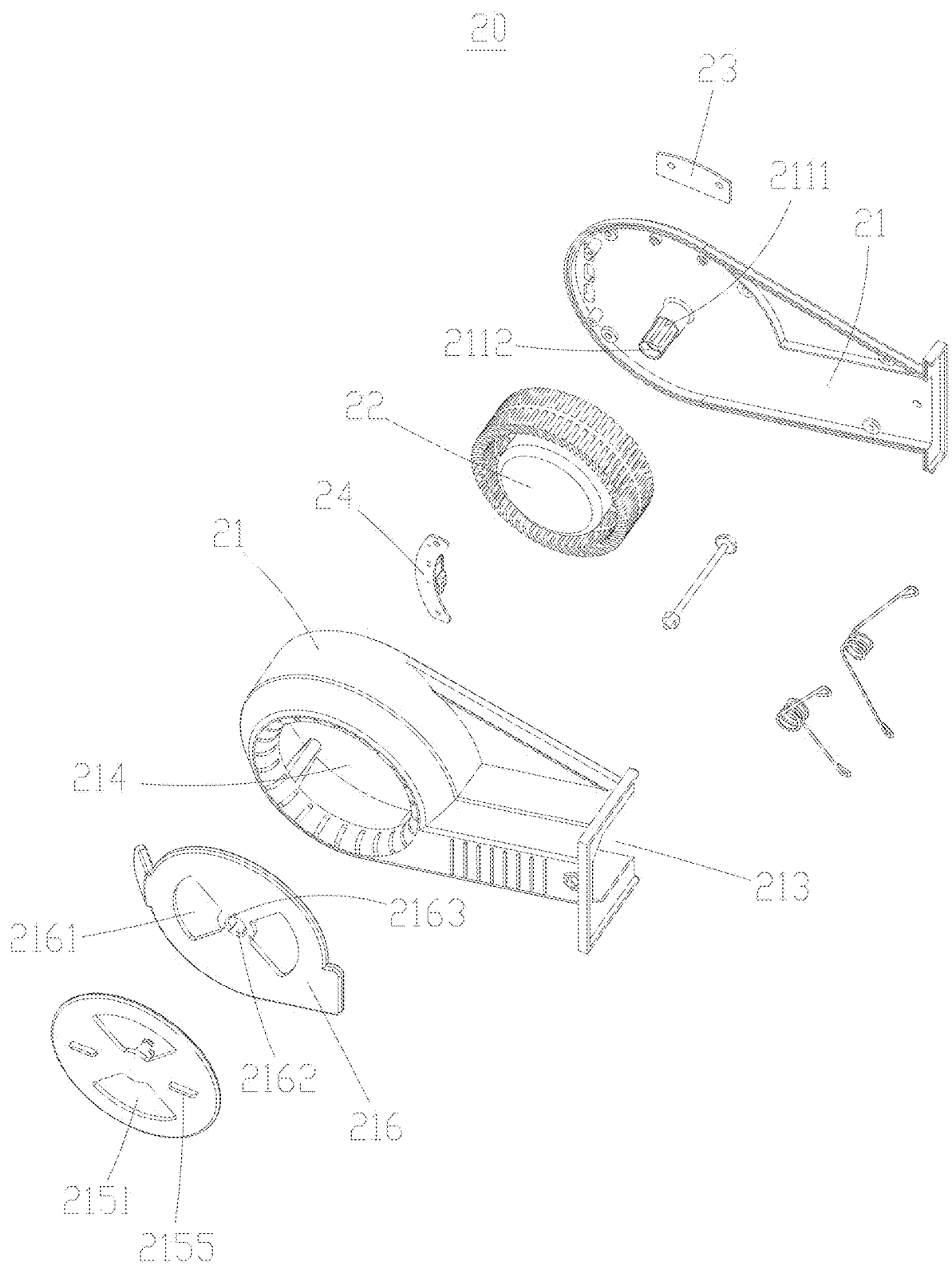
FIG. 9 is an exploded view diagram of the fan from another viewing angle.
Figure 10:
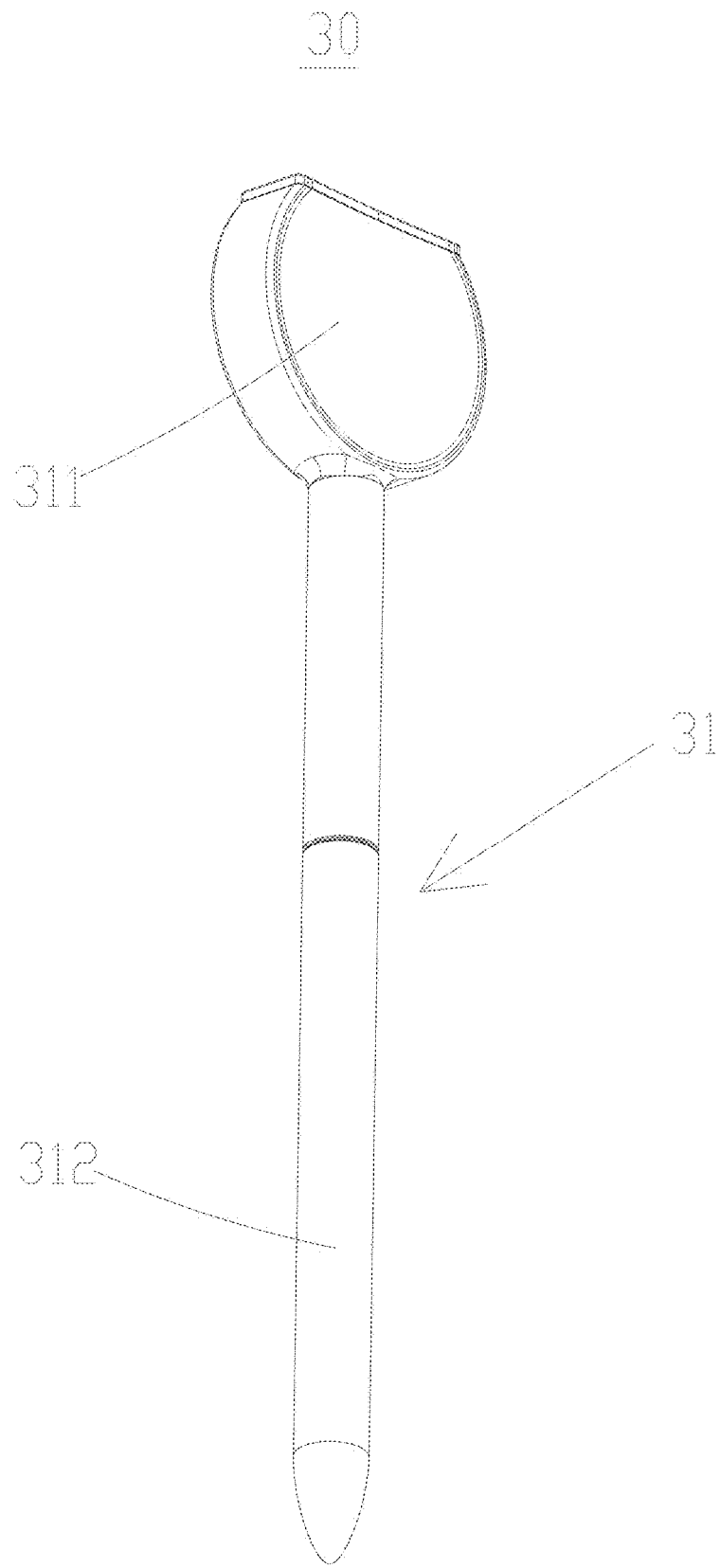
FIG. 10 is a schematic diagram of a 3D structure of a probe thermometer.
Figure 11:
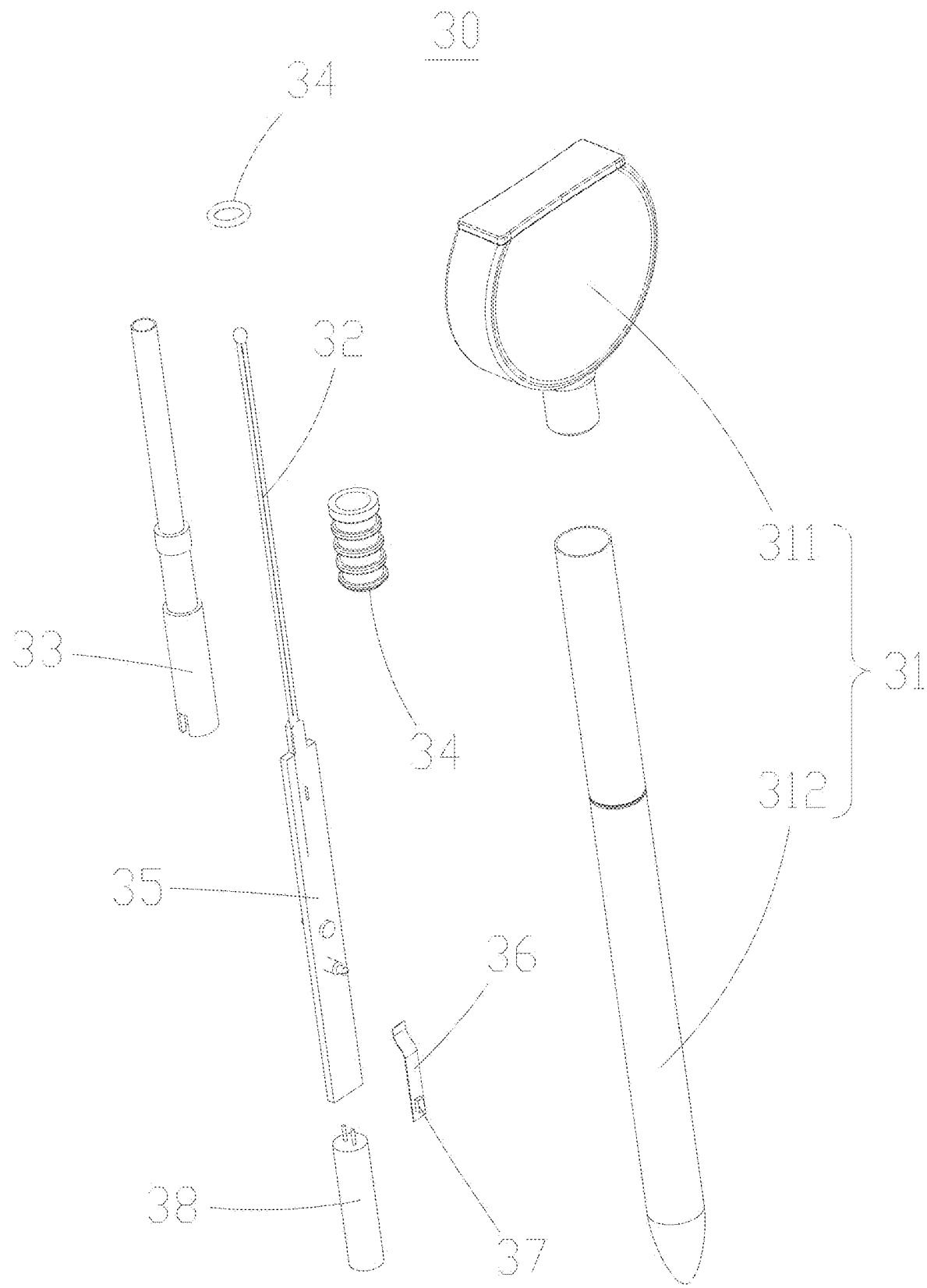
FIG. 11 is an exploded view diagram of the probe thermometer.
Figure 12:
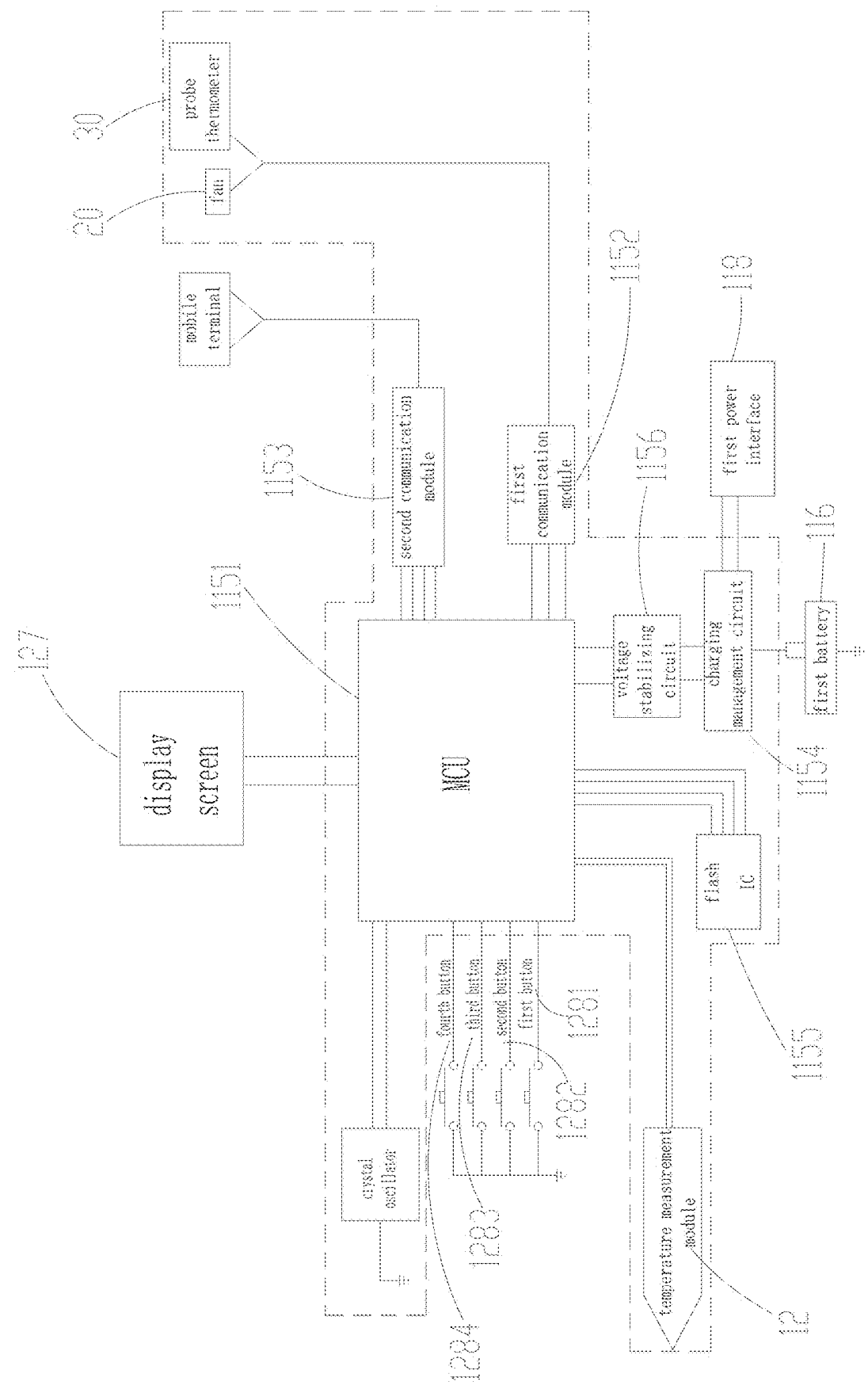
FIG. 12 is a schematic block diagram of a circuit of the temperature control system for the grill.

Reference signs are as follows:
main unit 10; fan 20; control module 11; temperature measurement module 12; anti-slip pad 13; first temperature sensor 121; first signal reception board 122; first housing 123; firstpogo pin 124; base 125; latch block 126; second housing 111; sliding groove 112; opening 1121; fixed end 1122; second pogo pin 113; screw thread 1211; nut 129; second signal reception board 114; first control main board 115; first battery 116; first charging circuit board 117; first power interface 118; third housing 21; fan blade 22; wireless signal board 23; second control main board 24; second power switch 25; second power interface 26; accommodating groove 211; air duct 212; air outlet 213; protruding shaft 2111; first shaft hole 2112; first rotating shaft 221; opening 214; first baffle plate 215; second baffle plate 216; second ventilation opening 2161; first ventilation opening 2151; second rotating shaft 2152; latch block 2153; second shaft hole 2162; first protruding strip 2154; protruding dot 2163; second protruding strip 2155; horizontal bar 27; elastic member 28; supporting rod 281; spring portion 282; probe thermometer 30; fourth housing 31; holding end 311; temperature measuring end 312; thermocouple grill temperature sensor 32; antenna connector 33; waterproof sealing ring 34; third control main board 35; flexible circuit board 36; digital temperature sensor 37; second battery 38; display screen 127; first button 1281; second button 1282; third button 1283; fourth button 1284; reset button 119; MCU1151; first wireless communication module 1152; second wireless communication module 1153; charging management circuit 1154; flash IC1155; voltage stabilizing circuit 1156; main unit 80; fourth housing 41; fifth housing 42; fourth control main board 43; fourth battery 44; first charging port 451; second charging port 452; third charging port 453; first slot 411; second slot 421; third slot 422; first elastic clip 4111; second elastic clip 4211; third elastic clip 4221; first groove 412; second groove 423; receiving slot 42a; rear cover42b; foot pad 42c; first sealing ring 42d; second display screen 46; fifth button 471; sixth button 472; fourth charging port 481; fifth charging port 483; inner casing 49; fourth housing 31.

DETAILED DESCRIPTION OF THE EMBODIMENTS

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Embodiment I

Figure 13:
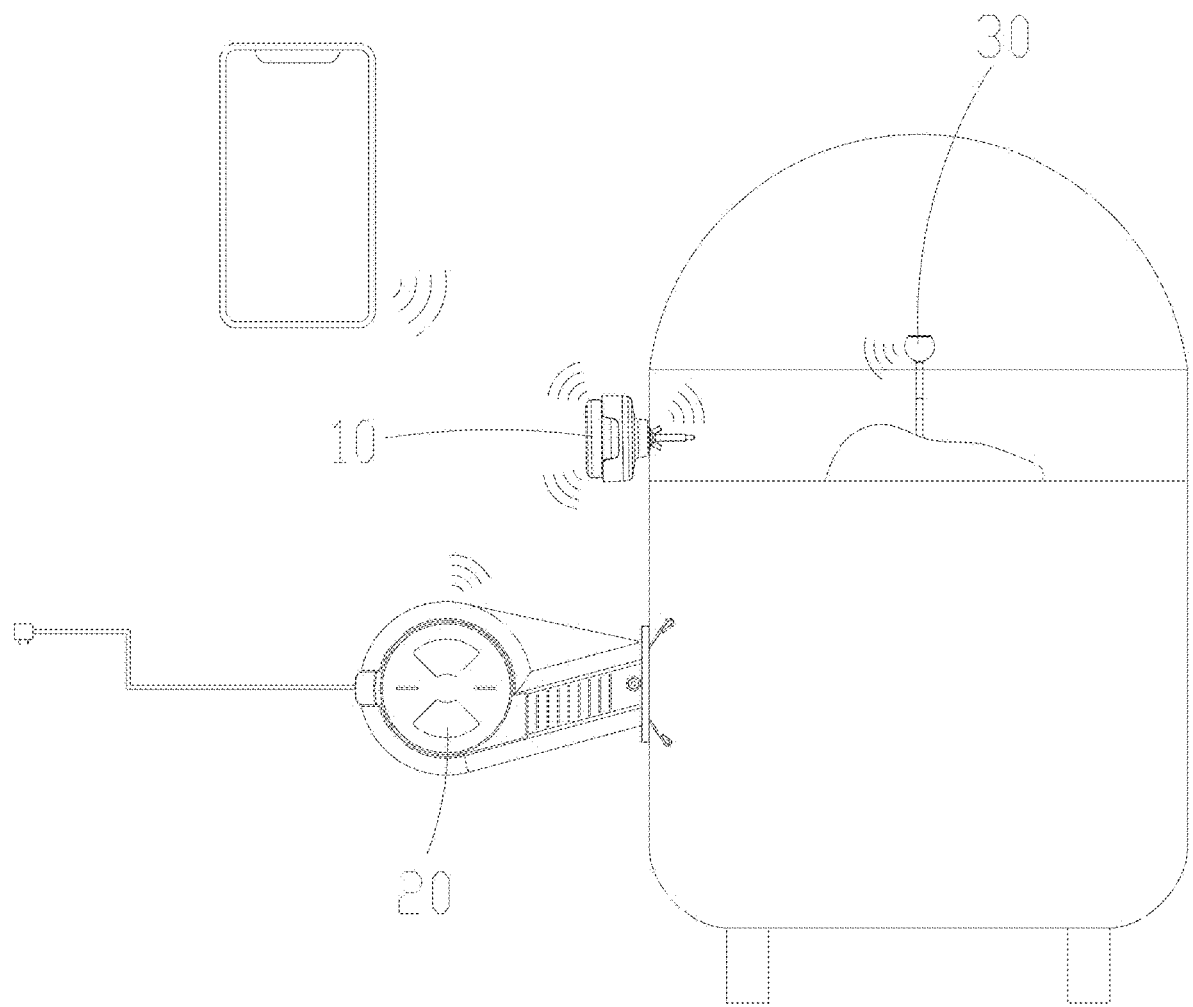
FIG. 13 is a schematic diagram of the temperature control system for the grill in another working status according to Embodiment I.
Figure 14:
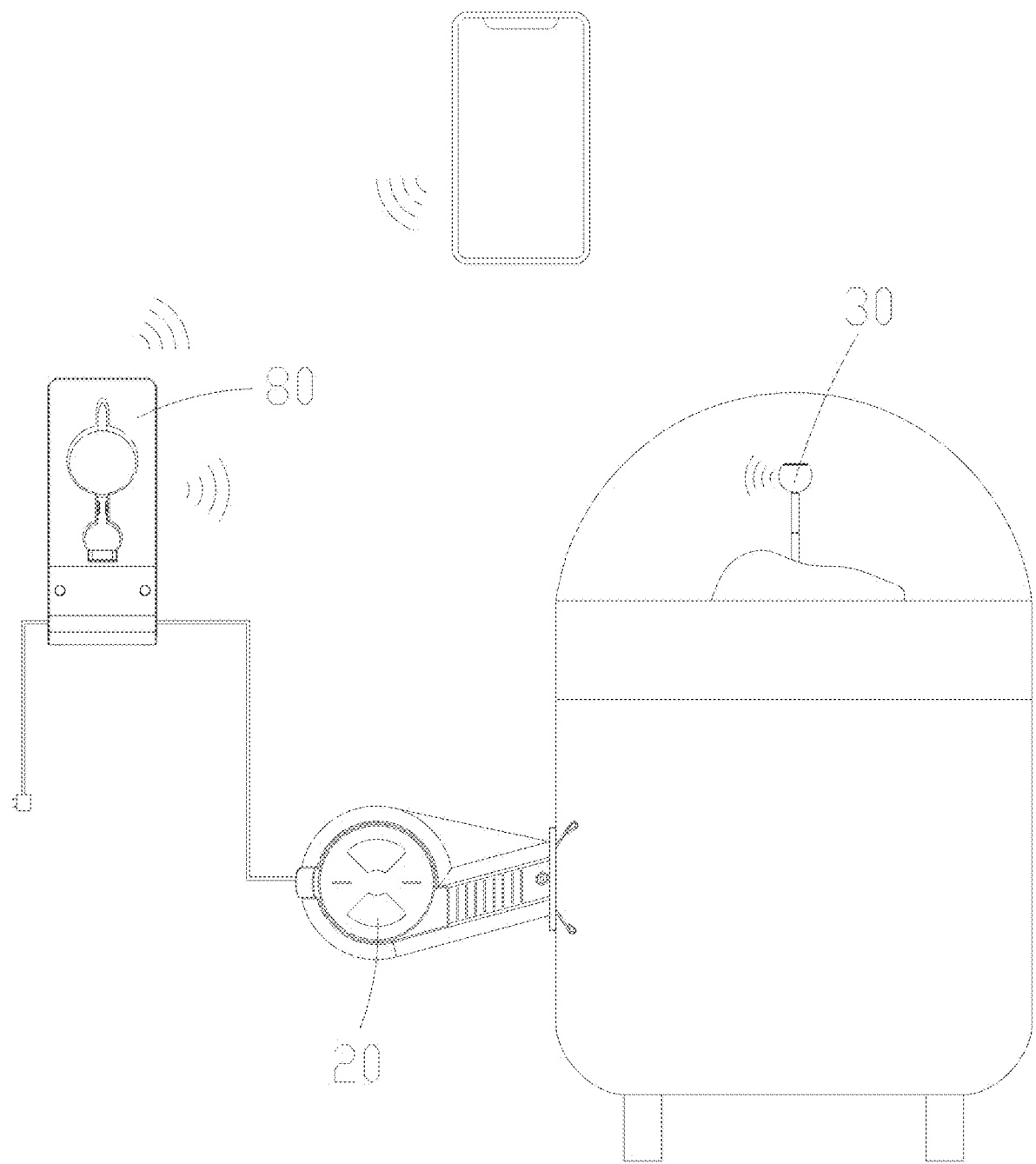
FIG. 14 is a schematic diagram of the temperature control system for the grill in the working status according to Embodiment II.
Figure 15:
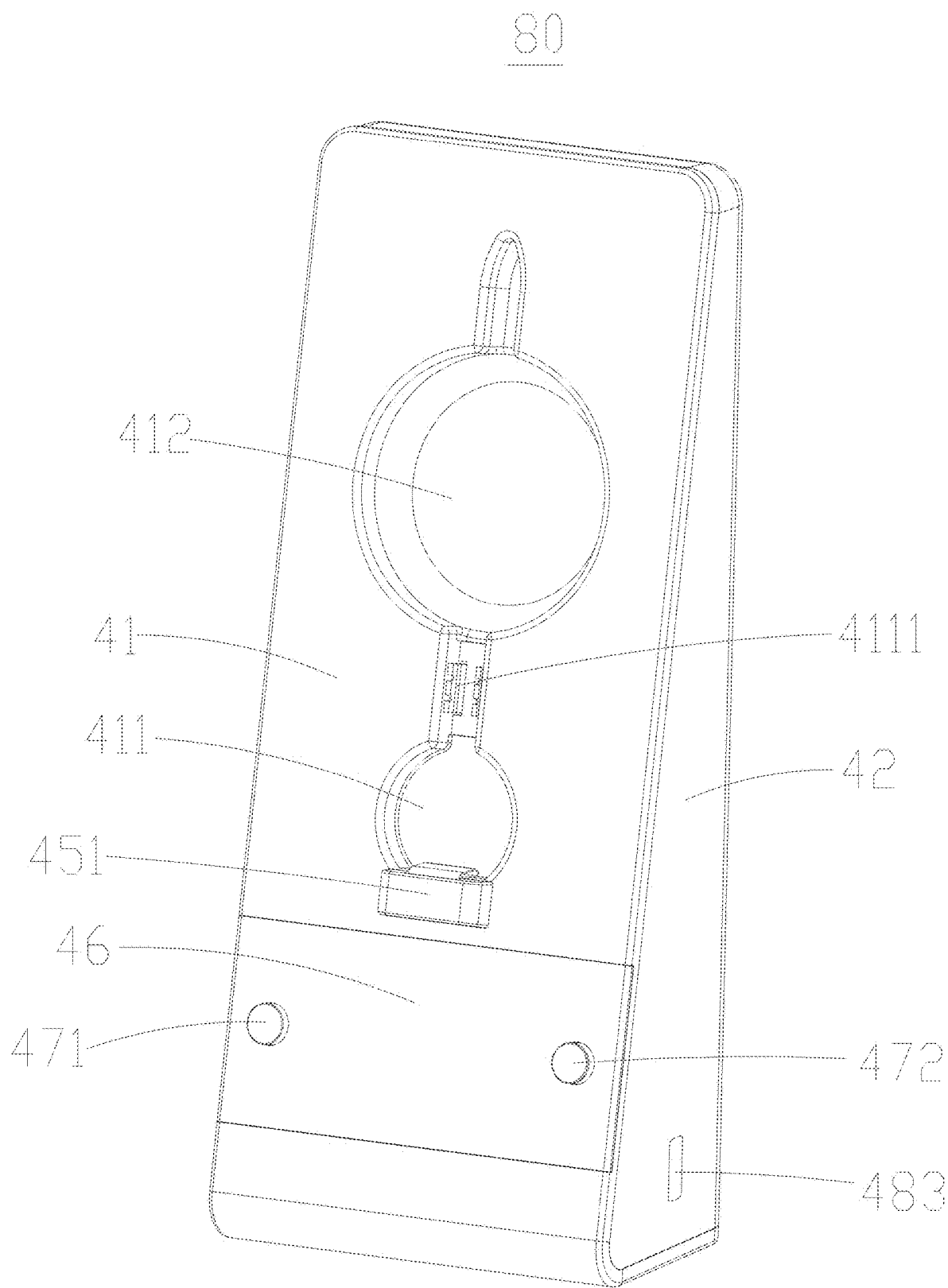
FIG. 15 is a schematic diagram of a 3D structure of the main unit as shown in FIG. 14.
Figure 16:
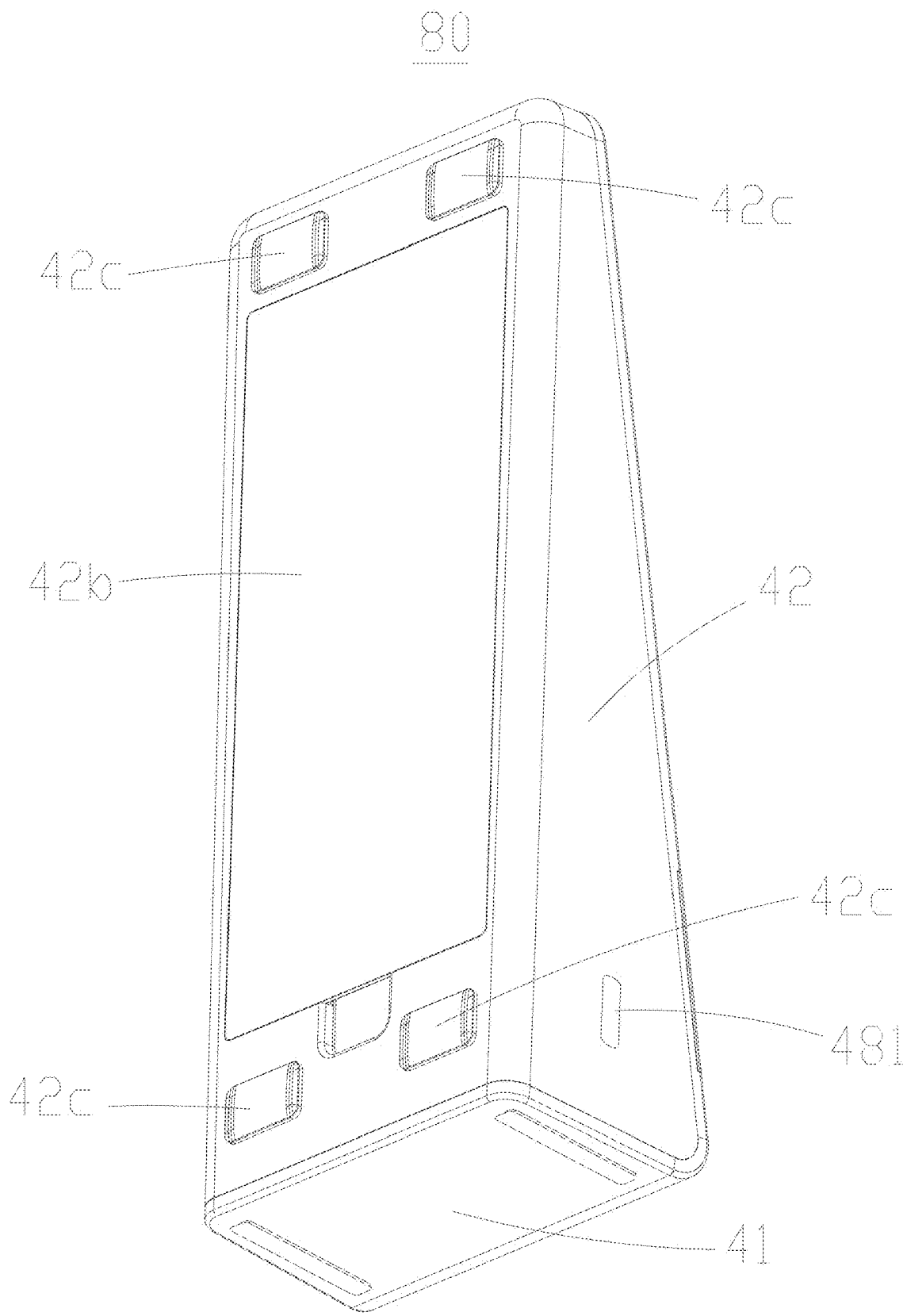
FIG. 16 is a schematic diagram of a 3D structure of the main unit from another viewing angle as shown in FIG. 14.
Figure 17:
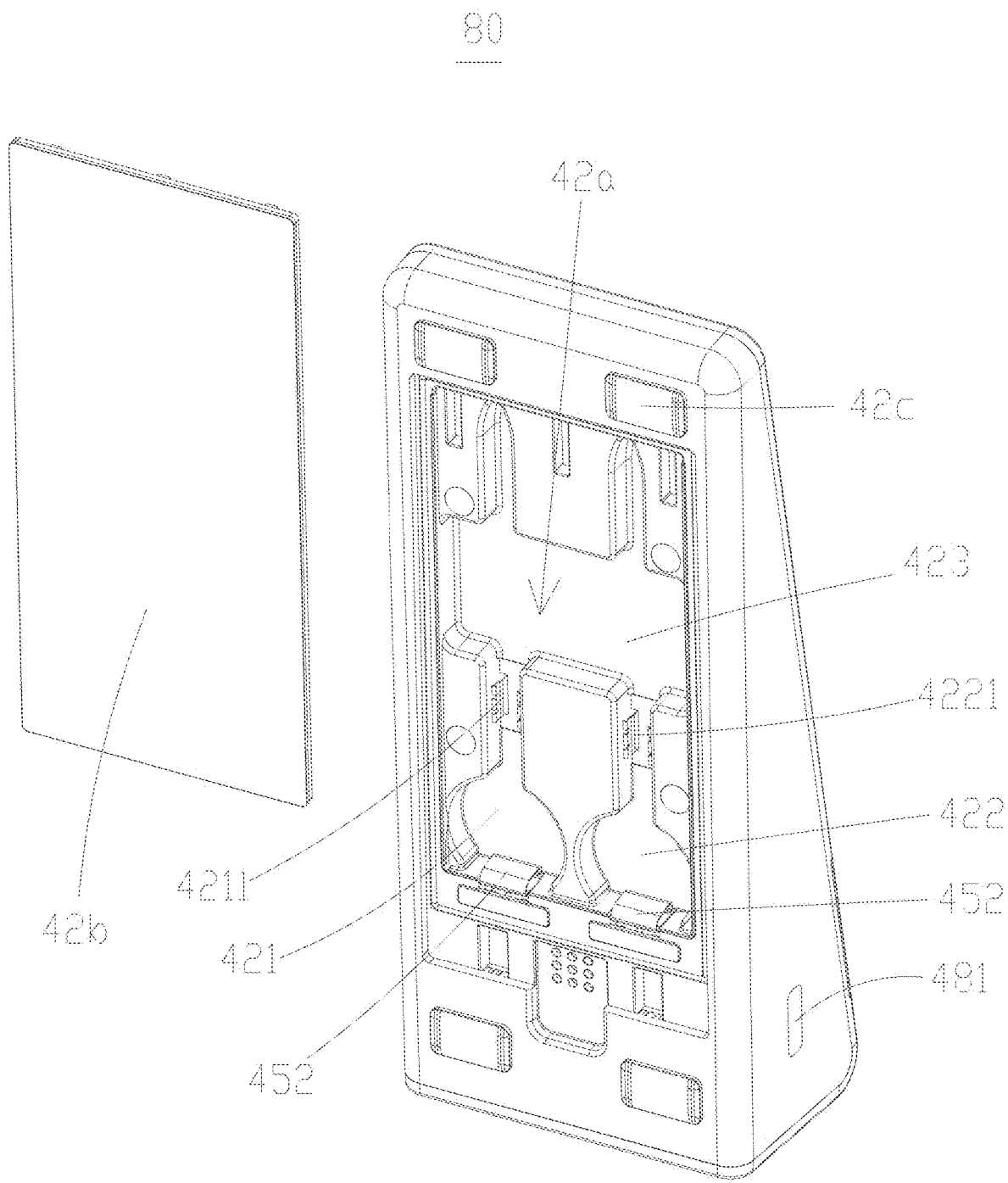
FIG. 17 is an exploded view diagram of the main unit as shown in FIG. 14.
Figure 18:
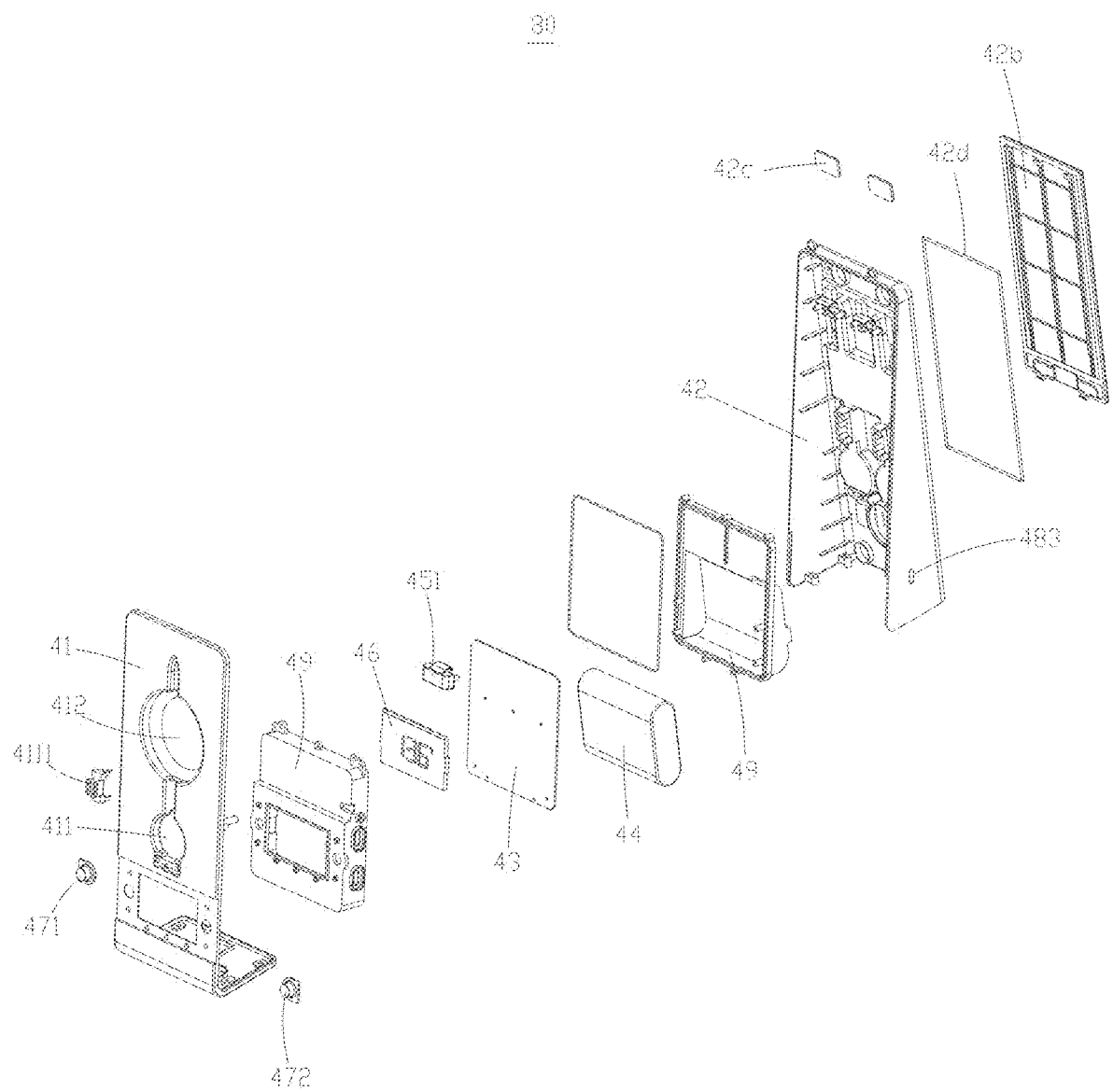
FIG. 18 is another exploded view diagram of the main unit as shown in FIG. 14.
Figure 19:
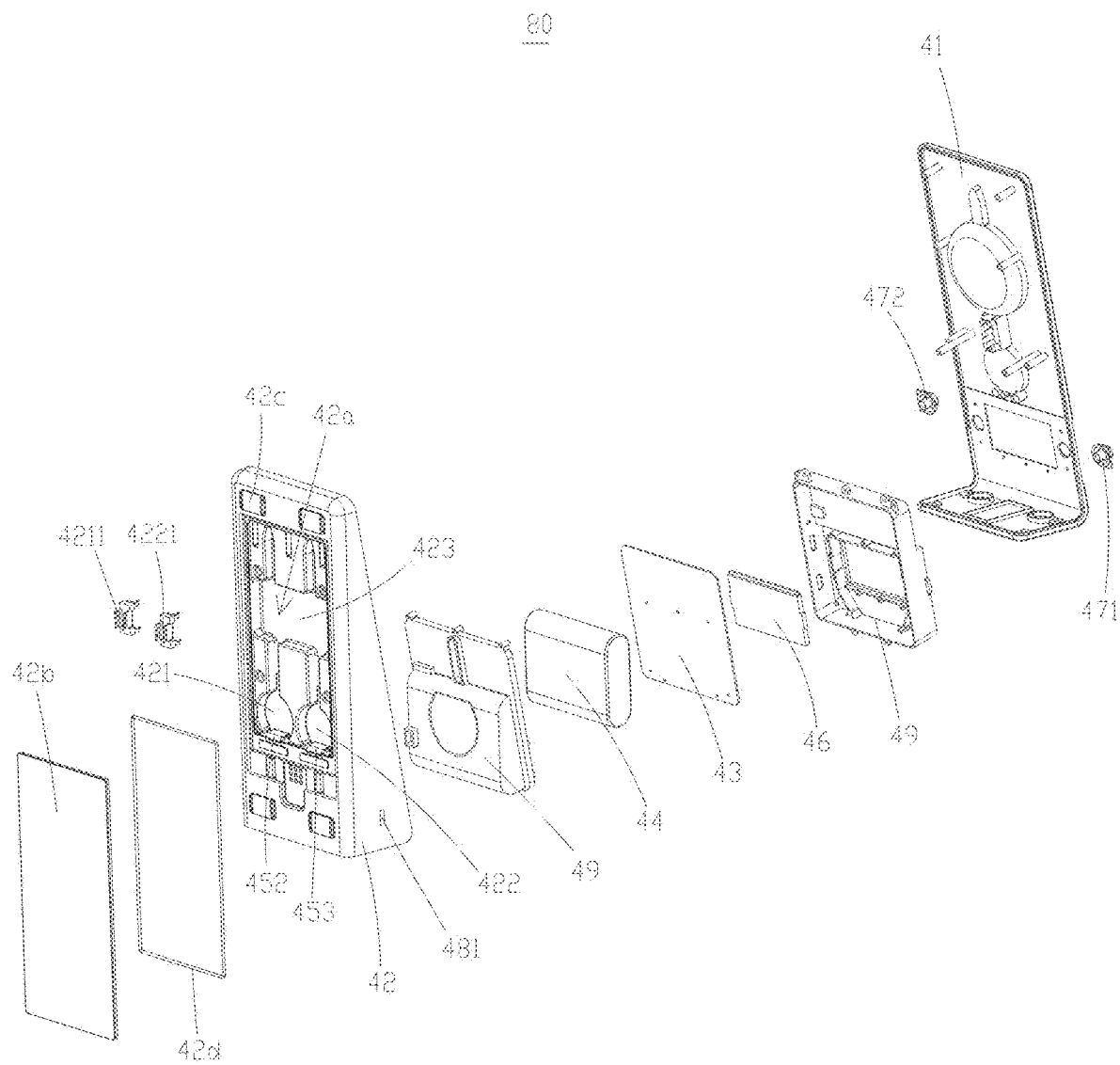
FIG. 19 is another exploded view diagram of the main unit as shown in FIG. 14.
Figure 20:
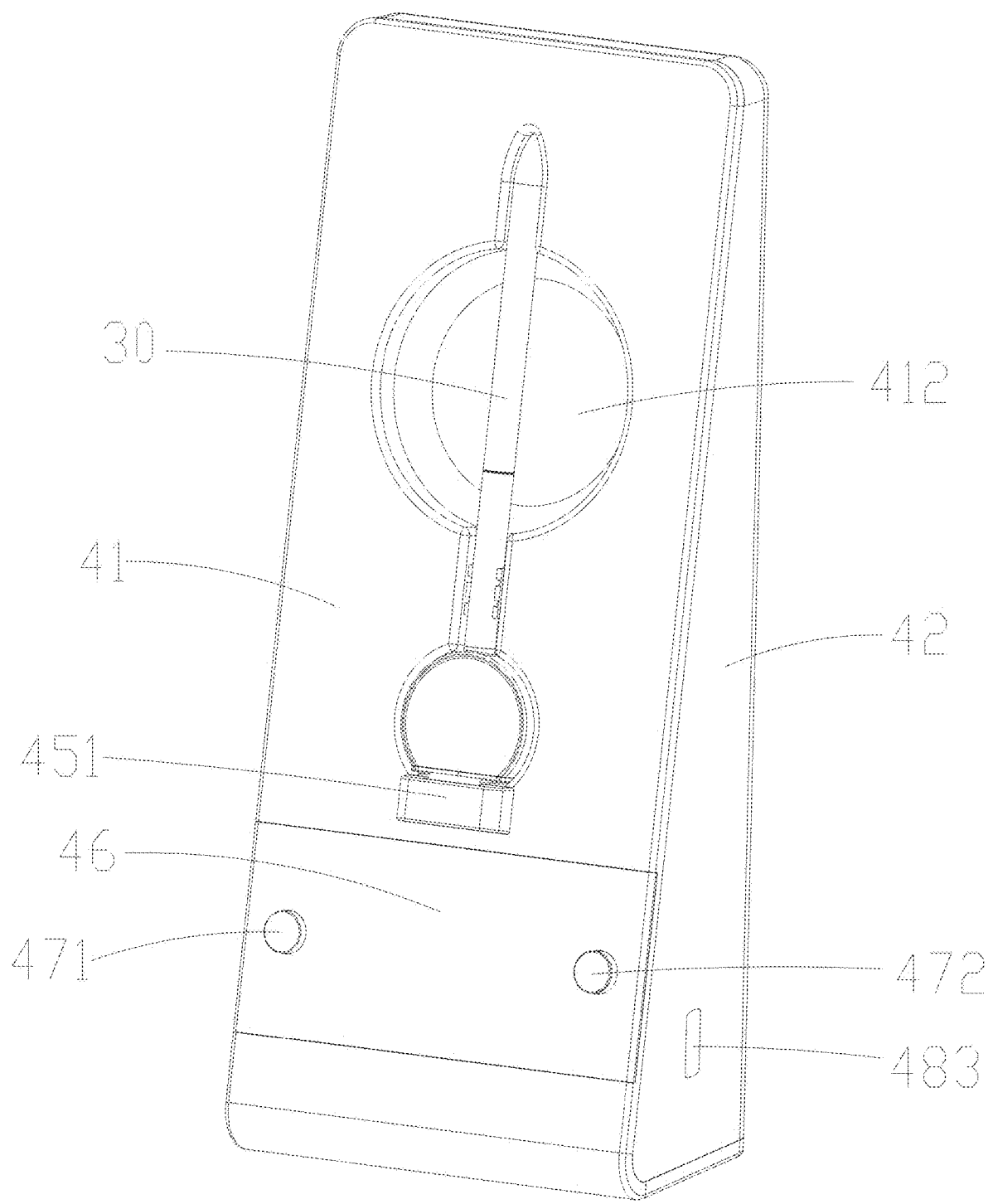
FIG. 20 is a working status diagram of the main unit as shown in FIG. 14.
Figure 21:
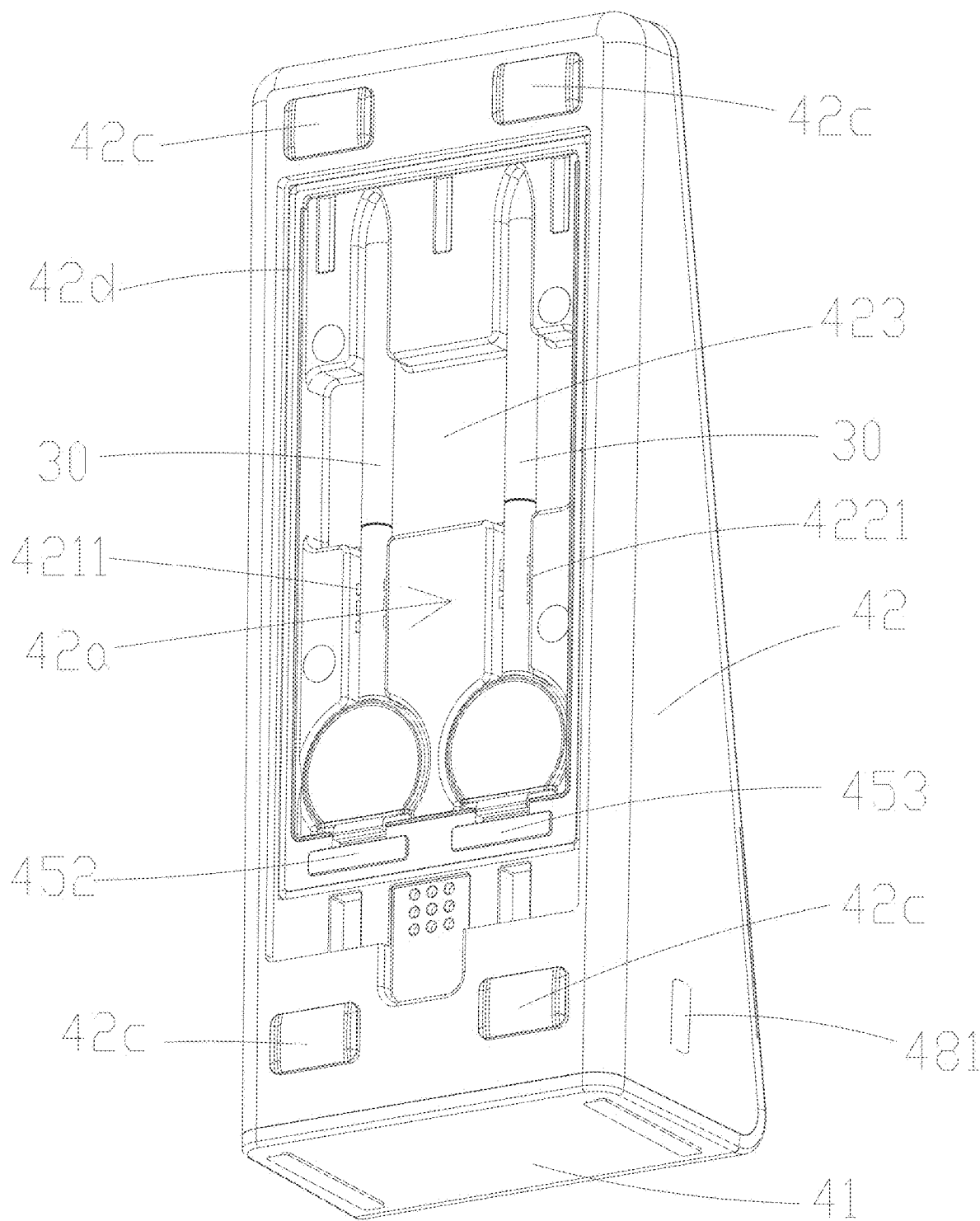
FIG. 21 is another working status diagram of the main unit as shown in FIG. 14.

Referring to FIG. 1 to FIG. 13, the present invention provides a temperature control system for a grill including a main unit 10 and a fan 20. The main unit 10 is configured to be mounted on the grill, and the fan 20 is positioned corresponding to the intake port of the grill to adjust the intake volume for controlling fuel combustion. The main unit 10 and the fan 20 are in communication. The main unit 10 includes a control module 11 and a temperature measurement module 12. The temperature measurement module 12 is used to detect the air ambient temperature of the grill and transmit a first temperature signal to the control module 11. The control module 11 is configured to control the power of the fan 20 or its on/off state based on the first temperature signal. Specifically, referring to FIG. 1, the main unit 10 can be mounted on the cover of the grill, and referring to FIG. 13, the main unit 10 can also be mounted on the wall of the grill.

It can be understood that the main unit is mounted on the grill to detect the air ambient temperature of the grill. The fan can increase the intake volume of the grill to increase the fuel combustion, thus accelerating the air ambient temperature rise of the grill. The temperature measurement module transmits the first temperature signal to the control module after measuring the air ambient temperature in the grill. The control module judges whether the air ambient temperature of the grill is appropriate based on the first temperature signal, and then controls the fan to increase or decrease its power or stop blowing. The connection between the main unit and the fan is wireless, and the wireless connection can be in a Bluetooth mode or a WiFi mode.

The temperature control system for the grill provided by the present invention enables the main unit to detect the air ambient temperature of the grill in real time. The system also includes a probe thermometer that can be inserted into the food, which can detect the temperature of the food in the grill more accurately and transmit the temperature signal wirelessly to the main unit. The main unit adjusts the rotating speed of the fan through the wireless signal, enabling the fan to blow air to the fuel inside the grill more intelligently to raise the air ambient temperature of the grill. Moreover, the temperature control system for the grill is wirelessly connected to the mobile terminal, providing convenience for users.

Furthermore, the temperature control system for the grill further includes a probe thermometer 30, which is wirelessly connected to the main unit 10. The probe thermometer 30 is used to be inserted into the food inside the grill to detect both the temperature of the food in the grill and the air ambient temperature of the grill, transmitting a food temperature signal and a grill temperature signal to the control module 11. The control module 11 is also configured to control the power of the fan 20 or its on/off state based on the food temperature signal and/or the grill temperature signal.

It can be understood that when using the grill, the probe thermometer is inserted into the food in the grill to detect the temperature of the food in the grill. Meanwhile, the probe thermometer can also detect the air ambient temperature of the grill and transmit the measured food temperature signal and the grill temperature signal to the main unit. The main unit controls the power of the fan 20 or its on/off state based on the food temperature signal and/or the grill temperature signal.

Furthermore, the temperature measurement module 12 includes a first housing 123, on which a raised base 125 is provided. The side wall of the base 125 is equipped with a latch block 126. The control module 11 includes a second housing 111, and the side wall of the second housing 111 is provided with a sliding groove 112 that cooperates with the latch block 126. The sliding groove 112 includes an opening 1121 and a fixed end 1122. The second housing 111 is positioned within the base 125, with the latch block 126 aligned with the sliding groove 112. The latch block 126 enters the sliding groove 112 from the opening 1121, and by rotating the second housing 111, the latch block 126 slides to the fixed end 1122, locking the second housing 111 with the first housing 123. Rotating the second housing 111 causes the latch block 126 to slide out from the opening 1121, thus detaching the second housing 111 from the first housing 123.

It can be understood that the number of the raised bases is three. And the three bases can ensure that the control module is fixed more stably. The latch block and the sliding groove can be used in cooperation to quickly detach or lock the first housing and the second housing. The structure is simple and convenient for users to use.

Furthermore, the temperature measurement module 12 also includes an anti-slip pad 13, the anti-slip pad 13 is arranged on an inner side of the base 125, and when the second housing 111 is placed within the base 125, the second housing 111 abuts against the anti-slip pad 13.

It can be understood that when the first housing and the second housing are locked, the anti-slip pad is compressed, which can make the locking of the first housing and the second housing more stable.

Furthermore, the temperature measurement module also includes a first signal reception board 122 arranged inside the first housing 123, a plurality of first pogo pins 124 connected with the first signal reception board 122 and a first temperature sensor 121 which is used to monitor a temperature. One end of the first temperature sensor 121 is fixedly connected with the first housing 123, and the other end of the first temperature sensor 121 is arranged the outer side of the first housing 123. The first temperature sensor 121 is electrically connected to the first signal reception board 122. In addition, the control module 11 also includes a plurality of second pogo pins 113, and after the second housing 111 is locked with the first housing 123, the second pogo pin 113 abuts against the first pogo pin 124; and the first temperature sensor 121 is made of a platinum resistance material.

It can be understood that one end of the first temperature sensor is arranged on the outer side of the first housing to detect the air ambient temperature of the grill and then transmits the detected temperature signal to the first signal reception board. And then, the abutting of the plurality of second pogo pins and the plurality of first pogo pins can increase the stability of the electrical connection. And then, the first temperature sensor is made of a platinum resistance material and has a more accurate temperature measurement performance compared with the traditional NTC.

Furthermore, the first temperature sensor 121 is equipped with a screw thread 1211, the temperature measurement module 12 also includes a nut 129 matched with the screw thread 1211, which can cooperate with the screw thread 1211 to fix the first temperature sensor 121 on the external hole site.

It can be understood that the main unit can be inserted into the hole site on the grill cover through the first temperature sensor, and then the nut is rotated to connect with the screw thread until it is locked, which can make the main unit firmly fixed on the cover of the grill.

Furthermore, the control module 11 also includes a second signal reception board 114 arranged inside the second housing 111, the second pogo pin 113 is electrically connected to the second signal reception board 114, and the second signal reception board 114 is configured to receive the first temperature signal. Then, the control module 11 further includes a first control main board 115 and a first battery 116 arranged inside the second housing 111, the first control main board 115 is electrically connected to the first battery 116 for supplying the power to the first control main board 115. Meanwhile, the second signal reception board 114 is electrically connected to the first control main board 115, and the second signal reception board 114 transmits the first temperature signal to the first control main board 115.

It can be understood that the first temperature signal measured by the temperature measurement module is transmitted to the second signal reception board through the second pogo pin and then transmits to the first control main board for processing. The first battery is directly electrically connected to the first control main board, and the current is processed and distributed by the first control main board to other components. The design is reasonable and the structure is simple.

Furthermore, the first control main board 115 includes an MCU 1151, a first wireless communication module 1152, a second wireless communication module 1153, a charging management circuit 1154, a flash IC 1155 and a voltage stabilizing circuit 1156. The MCU 1151 is electrically connected to the first wireless communication module 1152, the second wireless communication module 1153, the flash IC 1155 and the voltage stabilizing circuit 1156 respectively, and the charging management circuit 1154 is electrically connected to the voltage stabilizing circuit 1156. Then, the MCU 1151 is configured to wirelessly communicate with the fan 20 or the probe thermometer 30 through the first wireless communication module 1152, and the MCU 1151 is also configured to communicate with the mobile terminal through the second wireless communication module 1153 to transmit the working status and information of the main unit 10, the working status and information of the fan 20, and/or the working status and information of the probe thermometer 30 to the mobile terminal. The first wireless communication module 1152 is a Bluetooth module, and the second wireless communication module 1153 is a WiFi module.

It can be understood that through the above arranging, the working status and information of the main unit, the fan and the probe thermometer are wirelessly transmitted to the user's mobile terminal, which facilitates the user to monitor the temperature status in real time on the mobile terminal and provides great convenience to the user.

Furthermore, the control module 11 also includes a first charging circuit board 117 and a reset button 119 arranged inside the second housing 111, as well as a first power interface 118 arranged on the second housing 111. The first power interface 118 and the reset button 119 are electrically connected to the first charging circuit board 117 respectively, and the first charging circuit board 117 is electrically connected to the first control main board 115.

It can be understood that the current is transmitted to the first charging circuit board via the first power interface. After the first charging circuit board converts the current into a safe level, it is then transmitted to the first control main board to prevent the first control main board from being damaged by excessive current. The reset button allows the user to conveniently initialize the device.

Furthermore, the fan 30 includes a third housing 21 and a wireless signal board 23 arranged inside the third housing 21, and the wireless signal board 23 is configured to receive a wireless signal from the main unit 10.

It can be understood that through the wireless signal board, the fan can transmit and receive the wireless signal to and from the main unit. The design structure is reasonable and it is easy to use.

Furthermore, the fan 20 also includes a second control main board 24 arranged inside the third housing 21, a second power switch 25 and a second power interface 26 arranged on the third housing 21. The wireless signal board 23, the second power switch 25 and the second power interface 26 are electrically connected to the second control main board 24 respectively. The second control main board 24 is configured to control the power of the fan 20 or its on/off state. In addition, the fan 20 is externally connected to a 5V2A power adapter.

It can be understood that the fan uses the external 5V2A power supply. The current is conducted to the second control main board through the second power interface and then distributed by the second control main board to the wireless signal board and a fan. The second control main board can control the power on and off of the fan and the wireless signal board, and the second power switch can control the power on and off of the second control main board, which is convenient for users.

Furthermore, the fan 20 also includes a fan blade 22 arranged inside the third housing 21. The third housing 21 is equipped with an accommodating groove 211, an air duct 212 and an air outlet 213. Specifically, the accommodating groove 211, the air duct 212 and the air outlet 213 are connected in sequence, and the fan blade 22 is arranged inside the accommodating groove 211.

It can be understood that the size of the fan matches that of the accommodating groove. The wind generated by the rotation of the fan in the accommodating groove blows out from the air outlet after passing through the air duct.

Furthermore, a protruding shaft 2111 is arranged inside the accommodating groove 211, a first shaft hole 2112 is arranged on the protruding shaft 2111, a first rotating shaft 221 is arranged on the fan blade 22, and the first rotating shaft 221 is configured to rotate within the first shaft hole 2112.

It can be understood that the protruding shaft is arranged on a side wall of the accommodating groove, and the first shaft hole is arranged in a center of the protruding shaft. The size of the first rotating shaft on the fan is matched with the size of the first shaft hole, and the first rotating shaft is arranged in the first shaft hole so that the fan blade can rotate inside the accommodating groove.

Furthermore, an opening 214 is arranged at the position corresponding to the fan blade 22 on the third housing 21, the opening 214 is configured to allow air to enter the third housing 21. The third housing 21 also includes a first baffle plate 215 and a second baffle plate 216. The second baffle plate 216 is mounted at the opening 214, a second ventilation opening 2161 is arranged on the second baffle plate 216. The first baffle plate 215 is rotatably connected to the second baffle plate 216, and a first ventilation opening 2151 is arranged on the first baffle plate 215.

It can be understood that the opening is arranged to provide air intake for the fan. The second baffle plate is mounted at the opening, and a second ventilation opening is arranged on the second baffle plate. The second ventilation opening can provide air intake for the fan. The first baffle plate is rotatably connected to the second baffle plate, and a first ventilation opening is arranged on the first baffle plate. The first ventilation opening can provide air intake for the fan. When the first baffle plate is rotated to connect the first ventilation opening and the second ventilation opening, air intake for the fan can be provided. By rotating the first baffle plate to misalign the first ventilation opening and the second ventilation opening, the size of the air inlet can be adjusted, thereby adjusting the air intake of the fan.

Furthermore, the first baffle plate 215 is equipped with a second rotating shaft 2152, one end of the second rotating shaft 2152 is equipped with a latch block 2153, and the second baffle plate 216 is equipped with a second shaft hole 2162. The second rotating shaft 2152 is rotatably arranged within the second shaft hole 2162, and the latch block 2153 is clamped on an outer side of the second shaft hole 2162 to prevent the second rotating shaft 2152 from falling out of the second shaft hole 2162.

It can be understood that the size of the second rotating shaft matches the size of the second shaft hole. The second rotating shaft can rotate within the second shaft hole. After the second rotating shaft is inserted into the second shaft hole, the latch block at one end of the second rotating shaft can be clamped onto an outer side wall of the second shaft hole, thereby preventing the second rotating shaft from falling out of the second shaft hole and enhancing the stability.

Furthermore, a plurality of first protruding strips 2154 are arranged on the first baffle plate 215 surrounding the second rotating shaft 2152, correspondingly, a plurality of protruding dots 2163 are arranged on the second baffle plate 216 surrounding the second shaft hole 2162. When the first baffle plate 215 abuts against the second baffle plate 216, the protruding dot 2163 can be clamped in a gap of the first protruding strip 2154 to prevent the first baffle plate 215 and the second baffle plate 216 from rotating relatively. Meanwhile, a plurality of second protruding strips 2155 are arranged on an outer side wall of the first baffle plate 215.

It can be understood that the first protruding strips are arranged surrounding the second rotating shaft, and there are certain gaps between the first protruding strips. The diameter of the protruding dots matches the size of the gaps between the first protruding strips. Once the protruding dots are snapped into the gaps of the first protruding strips, they will be stable without shaking. By rotating the first baffle plate to snap the protruding dots into the gaps between the first protruding strips at different positions, the first baffle plate can be fixed at different positions. A plurality of second protruding strips are arranged on the outer side wall of the first baffle plate. When the user rotates the first baffle plate, the second protruding strips can provide friction, which is convenient for the user.

Furthermore, the fan 20 also includes a horizontal bar 27 and an elastic member 28 arranged at the air outlet 213. Two ends of the horizontal bar 27 are detachably connected to a side wall at the air outlet 213, and the elastic member 28 is rotatably arranged on the horizontal bar 27. The elastic member 28 includes two supporting rods 281 and a spring portion 282, and the two supporting rods 281 have an opening and closing angle between them.

It can be understood that the horizontal bar is detachably connected to the side wall at the air outlet, which is convenient for users to disassemble and replace it later. The two supporting rods of the elastic member are connected to the spring portion, making the two supporting rods elastic. The distance between the two ends when the two supporting rods open and close is at least greater than the height of the air outlet. When the air outlet of the fan is plugged into the air vent of the grill, the two supporting rods can abut against the side wall of the grill to fix the fan.

Furthermore, the probe thermometer 30 includes a fourth housing 31, and the fourth housing 31 includes a flat holding end 311 and a slender temperature measuring end 312. The probe thermometer 30 also includes a thermocouple grill temperature sensor 32, an antenna connector 33, a waterproof sealing ring 34, a third control main board 35, a flexible circuit board 36, a digital temperature sensor 37 and a second battery 38 arranged inside the fourth housing 31 respectively. The thermocouple grill temperature sensor 32, the antenna connector 33 and the flexible circuit board 36 are connected respectively to the third control main board 35, the digital temperature sensor 37 is arranged on one end of the flexible circuit board 36, the second battery 38 is electrically connected to the third control main board 35. Specifically, the second battery 38 is configured to supply power to the third control main board 35, the digital temperature sensor 37 is configured to measure the temperature of the food of the grill, the thermocouple grill temperature sensor 32 is configured to measure the air ambient temperature of the grill, The digital temperature sensor 37 transmits the temperature of the food of the grill to the third control main board 35, and the thermocouple grill temperature sensor 32 transmits the air ambient temperature of the grill to the third control main board 35. The third control main board 35 converts the temperature of the food of the grill and the air ambient temperature of the grill into the food temperature signal and the grill temperature signal, and the food temperature signal and the grill temperature signal are wirelessly transmitted to the main unit 10 via the antenna connector 33.

It can be understood that when the probe thermometer is in use, the user holds the holding end by hand and inserts the temperature measuring end into the food in the grill. The temperature measuring end is slender, which facilitates the user to insert the probe thermometer into the food. The second battery is electrically connected to the third control main board, and the third control main board then distributes the current to the thermocouple grill temperature sensor, the antenna connector, the flexible circuit board and the digital temperature sensor. The digital temperature sensor can measure the temperature of the food of the grill, and the thermocouple grill temperature sensor can measure the air ambient temperature of the grill. The digital temperature sensor and the thermocouple grill temperature sensor transmit the measured temperature signals to the third control main board. The third control main board converts the temperature signals into the food temperature signal and the grill temperature signal and then transmits a wireless signal to the main unit via the antenna connector, which is convenient for the user.

Furthermore, the control module 11 also includes a display screen 127, a first button 1281, a second button 1282, a third button 1283 and a fourth button 1284 arranged on the second housing 111 respectively. The display screen 127, the first button 1281, the second button 1282, the third button 1283 and the fourth button 1284 are electrically connected to the first control main board 115 respectively. Specifically, the display screen 127 is configured to display temperature information; the first button 1281 is configured to control power on and off of the main unit 10, the second button 1282 is configured to control the on/off state of the fan 20, the third button 1283 is configured to switch the temperature display unit on the display screen 127, and the fourth button 1284 is configured to control switching between the temperature signal of the probe thermometer 30 and the temperature signal of the temperature measurement module 12 on the display screen 127.

It can be understood that the display screen can display temperature information in real time, which is convenient for the users to view. The four buttons each have different functions, providing the users with more convenience and enhancing the user experience.

Furthermore, a main unit 10 for a temperature control system of a grill, the main unit is configured to be mounted on the grill, and a fan 20 is positioned corresponding to the intake port of the grill to adjust the intake volume for controlling fuel combustion. The main unit 10 and the fan 20 are in communication. The main unit 10 includes a control module 11 and a temperature measurement module 12. The temperature measurement module 12 is configured to detect the air ambient temperature of the grill and transmit a first temperature signal to the control module 11. The control module 11 is configured to control the power of the fan 20 or its on/off state based on the first temperature signal.

It can be understood that the main unit is mounted on the grill to detect the air ambient temperature of the grill. The fan can increase the intake volume of the grill so as to increase the fuel combustion and thus accelerate the temperature rise of the grill. After the temperature measurement module measures the air ambient temperature of the grill, it transmits the first temperature signal to the control module. The control module judges whether the air ambient temperature of the grill is appropriate based on the first temperature signal, and then controls the fan to increase or decrease its power or stop blowing. The main unit and the fan are wirelessly connected, and the wireless connection can be in the Bluetooth mode or the WIFI mode.

The main unit of the grill provided by the present invention can detect the air ambient temperature of the grill in real time. The system also includes a probe thermometer that can be inserted into the food, which can detect the temperature of the food in the grill more accurately and transmit the temperature signal wirelessly to the main unit. The main unit adjusts the rotating speed of the fan through the wireless signal, enabling the fan to blow air to the fuel in the grill more intelligently to raise the air ambient temperature of the grill. Moreover, the temperature control system of the grill is wirelessly connected to the mobile terminal, providing convenience for users.

Furthermore, a fan 20 for a temperature control system of a grill, the fan 20 is positioned corresponding to the intake port of the grill to adjust the intake volume for controlling fuel combustion, the fan 20 and a main unit 10 are in communication either by wired means or by wireless means. The main unit 10 is configured to get the air ambient temperature of the grill and control the power of the fan 20 or its on/off state based on the air ambient temperature of the grill.

It can be understood that the fan and the main unit can be connected in a wireless mode. In this state, the fan is powered by an external power source through a power cord, and the main unit sends instructions to the fan via the wireless signal to control the power of the fan or its on/off state. The fan and the main unit can also be connected by wires. In this state, the fan does not need an external power source, and the main unit provides power to the fan through the wires and also sends instructions to the fan through the wires to control the power of the fan or its on/off state. The fan is positioned at the intake port of the grill. Increasing the power of the fan can increase its rotating speed, thus providing more intake volume for the fuel in the grill, promoting the combustion of the fuel and increasing the air ambient temperature in the grill. Decreasing the power of the fan can reduce its rotating speed, thus lessening the intake volume provided for the fuel in the grill, making the fuel burn more slowly and lowering the air ambient temperature of the grill.

Embodiment II

The present invention also includes a second embodiment. In the second embodiment, the fan 20 and the probe thermometer 30 are the same as that in the first embodiment. The difference lies in that the main unit 80 is connected to the fan 20 by wires.

Referring to FIG. 14 to FIG. 21, a temperature control system for a grill includes a main unit 80, a fan 20, and a probe thermometer 30. The fan 20 is positioned corresponding to the intake port of the grill to adjust the intake volume for controlling fuel combustion. The probe thermometer 30 is wirelessly connected to the main unit 80 and is configured to be inserted into the food in the grill to detect the temperature of the food and the air ambient temperature of the grill, and then transmit a food temperature signal and a grill temperature signal to the main unit 80. The main unit 80 is configured to control the power of the fan 20 or its on/off state based on the food temperature signal and/or the grill temperature signal.

It can be understood that the main unit is connected to the fan by wires. The main unit is arranged on an outer side of the grill, while the fan is positioned corresponding to the intake port of the grill. The probe thermometer is wirelessly connected to the main unit. The probe thermometer is inserted into the food in the grill to detect the temperature of the food of the grill. Meanwhile, the probe thermometer can also detect the air ambient temperature of the grill, and transmit a measured food temperature signal and a grill temperature signal to the main unit. The main unit controls the power of the fan or its on/off state based on the food temperature signal and/or the grill temperature signal.

Furthermore, the main unit 80 supplies power to the fan 20 through wires. The main unit 80 is configured to charge the probe thermometer 30. The main unit 80 is also configured to be wirelessly connected to a mobile terminal. The main unit 80 includes a fourth housing 41 and a fifth housing 42, and the fourth housing 41 and the fifth housing 42 are assembled to form a space. The main unit 80 also includes a fourth control main board 43 and a fourth battery 44 arranged inside the space. The fourth control main board 43 is electrically connected to the fourth battery 44, and the fourth battery 44 is configured to supply power to the fourth control main board 43. The fourth control main board 43 is configured to control electronic control management and wireless signal transmission of the main unit 80.

It can be understood that the main unit can charge the probe thermometer, which is convenient for users. The main unit is configured to be wirelessly connected to the mobile terminal. Users can download a dedicated APP on their mobile phones and connect with the main unit wirelessly, so as to control the temperature control system for the grill, which is also convenient for users. The wireless mode can be either WiFi or Bluetooth. The fourth control main board integrates a wireless transmission module and a circuit control module, featuring high integration and space saving. The fourth battery supplies power to the whole main unit through electrical connection with the fourth control main board.

Furthermore, the main unit 80 also includes a first charging port 451, a second charging port 452 and a third charging port 453. The first charging port 451 is arranged on the fourth housing 41, while the second charging port 452 and the third charging port 453 are arranged on the fifth housing 42. The first charging port 451, the second charging port 452 and the third charging port 453 are electrically connected to the fourth control main board 43 respectively. The first charging port 451, the second charging port 452 and the third charging port 453 are configured to charge the probe thermometer 30.

It can be understood that the first charging port is arranged on the fourth housing, and the second charging port and the third charging port are arranged on the fifth housing. The main unit has three positions for charging the probe thermometer, so it can charge three probe thermometers, providing more convenience for users.

Furthermore, the fourth housing 41 is equipped with a first slot 411 that matches the size of the probe thermometer 30, and the first charging port 451 is arranged inside the first slot 411. The fifth housing 42 is equipped with a second slot 421 and a third slot 422 which match the size of the probe thermometer 30. The second charging port 452 is arranged inside the second slot 421, and the third charging port 453 is arranged inside the third slot 422. The first slot 411, the second slot 421 and the third slot 422 are configured to accommodate the probe thermometer 30. The second slot 421 and the third slot 422 are arranged side by side.

It can be understood that the sizes of the first slot, the second slot and the third slot match the size of the probe thermometer. The probe thermometer can be accommodated in the first slot, the second slot and the third slot for charging. The first slot is arranged on the fourth housing, and the second slot and the third slot are arranged side by side on the fifth housing.

Furthermore, a first elastic clip 4111 is arranged inside the first slot 411. The first elastic clip 4111 is detachably connected to the fourth housing 41, and the first elastic clip 4111 is configured to clamp the probe thermometer 30. A second elastic clip 4211 is arranged inside the second slot 421. The second elastic clip 4211 is detachably connected to the fifth housing 42, and the second elastic clip 4211 is configured to clamp the probe thermometer 30. A third elastic clip 4221 is arranged inside the third slot 422. The third elastic clip 4221 is detachably connected to the fifth housing 42, and the third elastic clip 4221 is configured to clamp the probe thermometer 30. The fourth housing 41 is equipped with a first groove 412, and the first groove 412 is communicated with a middle part of the first slot 411. The fifth housing 42 is equipped with a second groove 423, and the second groove 423 is communicated with the second slot 421 and the third slot 422.

It can be understood that the first elastic clip, the second elastic clip and the third elastic clip are elastic and can clamp the probe thermometer by elastic force. They are simple in design and reasonable in structure. The first groove and the second groove facilitate users to take out the probe thermometer. The first groove is communicated with the first slot, and the second groove is communicated with the second slot and the third slot. Users can put their fingers into the first groove or the second groove to take out the probe thermometer, thus improving the user experience.

Furthermore, a receiving slot 42a is arranged on the fifth housing 42. The second slot 421, the third slot 422 and the second groove 423 are arranged in the receiving slot 42a. The fifth housing 42 includes a rear cover 42b which matches the receiving slot 42a. The rear cover 42b is configured to be detachably covered on the receiving slot 42a. The fifth housing 42 further includes a first sealing ring 42d. The first sealing ring 42d is arranged on an edge of an opening of the receiving slot 42a. Besides, the fifth housing 42 also includes a foot pad 42c.

It can be understood that arranging the second slot, the third slot and the second groove inside the receiving slot results in high integration and a simple design. Using the rear cover to directly cover the receiving slot can protect the second slot, the third slot, the second groove and the probe thermometer being charged therein, which is a reasonable design. Moreover, there is a first sealing ring on the edge of the opening of the receiving slot. After the rear cover is covered on the receiving slot, the first sealing ring can play a role in waterproofing and dustproofing. When the main unit is placed on an object, the foot pad can play a role in anti-slip and shock absorption.

Furthermore, the main unit 80 further includes a second display screen 46, a fifth button 471 and a sixth button 472 which are arranged on the fourth housing 41. The fifth button 471 and the sixth button 472 are respectively arranged on a left and right sides of the second display screen 46. The second display screen 46, the fifth button 471 and the sixth button 472 are electrically connected to the fourth control main board 43 respectively. The main unit 80 further includes a fourth charging port 481 arranged on a left side wall of the fourth housing 41 and a fifth charging port 483 arranged on a right side wall of the fourth housing 41. The fourth charging port 481 and the fifth charging port 483 are electrically connected to the fourth control main board 43 respectively. The fourth charging port 481 is configured to connect an external power source to supply power to the main unit 80, and the fifth charging port 483 is configured to connect a wire to supply power to the fan 20. The main unit 80 also includes an inner casing 49. The fourth control main board 43 and the fourth battery 44 are arranged inside the inner casing 49.

It can be understood that the second display screen is configured to display information such as temperature and signals, which is convenient for users to view. The fifth button and the sixth button can respectively control the power switch and mode switching of the main unit. The fourth charging port is connected to the external power source and is configured to supply power to the main unit. The fifth charging port is connected to a wire, and the other end of the wire is connected to the fan. The main unit supplies power to the fan through the fifth charging port. The fourth control main board and the fourth battery are arranged inside the inner casing, and the inner casing can further protect the fourth control main board and the fourth battery.

The temperature control system for the grill provided by the present invention, the main unit is connected to the fan through wires. The probe thermometer can be inserted into the food in the grill to detect the temperature of the food and the air ambient temperature of the grill in real time, and transmit the food temperature signal and the grill temperature signal to the main unit in a wireless mode. The main unit controls the on/off state of the fan based on the food temperature signal, and controls the power of the fan based on the grill temperature signal, so that the fan can blow air to the fuel in the grill in a more intelligent manner to control the air ambient temperature of the grill, which is convenient for users to cook delicious food. Moreover, the main unit can be wirelessly connected to the mobile terminal, facilitating users to monitor the temperature on the mobile phone or control the temperature control system for the grill.

One or more implementation modes are provided above in combination with specific contents, and it is not deemed that the specific implementation of the present invention is limited to these specifications. Any technical deductions or replacements approximate or similar to the method and structure of the present invention or made under the concept of the present invention shall fall within the scope of protection of the present invention.

What is claimed is:

1. A temperature control system for a grill, comprising:
a main unit; a fan; and
a probe thermometer;

wherein the main unit is configured to be mounted on the grill, the fan is positioned corresponding to an intake port of the grill to adjust an intake volume for controlling fuel combustion, and the main unit and the fan are in communication; the main unit comprises a control module and a temperature measurement module, the temperature measurement module is configured to detect an air ambient temperature of the grill and transmit a first temperature signal to the control module, wherein the probe thermometer is wirelessly connected to the main unit, the probe thermometer is configured to be inserted into a food in the grill to detect the temperature of the food and the air ambient temperature of the grill, and transmit a food temperature signal and a grill temperature signal to the control module; the control module is further configured to control the power of the fan or its on/off state based on the food temperature signal and/or the grill temperature signal, wherein the probe thermometer comprises a first housing, the first housing comprises a holding end and a temperature measuring end; the probe thermometer further comprises a thermocouple grill temperature sensor, an antenna connector, a waterproof sealing ring, a first control main board, a circuit board, a digital temperature sensor and a first battery arranged inside the first housing, the thermocouple g rill temperature sensor, the antenna connector and the circuit board are connected to the first control main board, the digital temperature sensor is arranged on one end of the circuit board, the first battery is electrically connected to the first control main board, and the first battery is configured to supply power to the first control main board; the digital temperature sensor is configured to measure the temperature of the food of the grill, the thermocouple g rill temperature sensor is configured to measure the air ambient temperature of the g rill, the digital temperature sensor transmits the food temperature of the grill to the first control main board, the thermocouple grill temperature sensor transmits the air ambient temperature of the grill to the first control main board, the first control main board converts the temperature of the food of the grill and the air ambient temperature of the g rill into the food temperature signal and the grill temperature signal, and the food temperature signal and the grill temperature signal are wirelessly transmitted to the main unit via the antenna connector.

2. The temperature control system for the grill according to claim 1, wherein the temperature measurement module comprises a second housing, the second housing is equipped with a raised base, and a side wall of the base is equipped with a latch block; the control module comprises a third housing, a sliding groove used in cooperation with the latch block is arranged on a side wall of the third housing, the sliding groove comprises an opening and a fixed end, the third housing is positioned within the base, with the latch block aligned with the sliding g roove, the latch block enters the sliding groove from the opening, and by rotating the third housing, the latch block slides to the fixed end, locking the third housing with the second housing; and rotating the third housing causes the latch block slide out from the opening, thus detaching the third housing from the second housing.

3. The temperature control system for the grill according to claim 2, wherein the temperature measurement module further comprises an anti-slip pad, the anti-slip pad is arranged on an inner side of the base, and when the third housing is placed within the base, the third housing abuts against the anti-slip pad.

4. The temperature control system for the grill according to claim 2, wherein the temperature measurement module further comprises a first signal reception board arranged inside the second housing, a plurality of first pogo pins connected to the first signal reception board and a first temperature sensor configured to monitor a temperature, one end of the first temperature sensor is fixedly connected to the second housing, the other end of the first temperature sensor is arranged an outer side of the second housing, and the first temperature sensor is electrically connected to the first signal reception board; the control module further comprises a plurality of second pogo pins, and after the third housing is locked with the second housing, the second pogo pin abuts against the first pogo pin; and the first temperature sensor is made of a platinum resistance material.

5. The temperature control system for the grill according to claim 4, wherein the first temperature sensor is equipped with a screw thread, the temperature measurement module further comprises a nut matched with the screw thread, and the nut cooperates with the screw thread to fix the first temperature sensor at an external hole site.

6. The temperature control system for the grill according to claim 5, wherein the control module further comprises a second signal reception board arranged inside the third housing, the second pogo pin is electrically connected to the second signal reception board, and the second signal reception board is configured to receive the first temperature signal; the control module further comprises a second control main board and a second battery arranged inside the third housing, the second control main board is electrically connected to the second battery, and the second battery is configured to supply power to the second control main board; the second signal reception board is electrically connected to the second control main board, and the second signal reception board transmits the first temperature signal to the second control main board.

7. The temperature control system of the grill according to claim 6, wherein the second control main board comprises an MCU, a first wireless communication module, a second wireless communication module, a charging management circuit, a f lash IC, and a voltage stabilizing circuit; the MCU is electrically connected to the first wireless communication module, the second wireless communication module, the flash IC and the voltage stabilizing circuit, the charging management circuit is electrically connected to the voltage stabilizing circuit, the MCU is configured to wirelessly communicate with the fan or the probe thermometer through the first wireless communication module, and the MCU is further configured to communicate with a mobile terminal through the second wireless communication module to transmit a working status and information of the main unit, a working status and information of the f an, and/or a working status and information of the probe thermometer to the mobile terminal; the first wireless communication module is a Bluetooth module, and the second wireless communication module is a WiFi module.

8. The temperature control system for the grill according to claim 7, wherein the control module further comprises a first charging circuit board and a reset button arranged inside the third housing, as well as a first power interface arranged on the third housing, the first power interface and the reset button are electrically connected to the first charging circuit board respectively, and the first charging circuit board is electrically connected to the second control main board.

9. The temperature control system for the grill according to claim 1, wherein the fan comprises a fourth housing and a wireless signal board arranged inside the fourth housing, and the wireless signal board is configured to receive a wireless signal from the main unit.

10. The temperature control system for the grill according to claim 1, wherein the fan further comprises a second control main board arranged inside the fourth housing, a second power switch and a second power interface arranged on the fourth housing, the wireless signal board, the second power switch and the second power interface are electrically connected to the second control main board respectively; the second control main board is configured to control the power of the fan or its on/off state; and the fan is externally connected to a 5V2A power adapter.

11. The temperature control system for the grill according to claim 9, wherein the fan further comprises a fan blade arranged inside the fourth housing, the fourth housing is equipped with an accommodating groove, an air duct and an air outlet, and the accommodating groove, the air duct and the air outlet are connected in sequence; the fan blade is arranged inside the accommodating g roove; a protruding shaft is arranged inside the accommodating groove, a first shaft hole is arranged on the protruding shaft, a first rotating shaft is arranged on the fan blade, and the first rotating shaft is configured to rotate within the first shaft hole.

12. The temperature control system for the grill according to claim 11, wherein an opening is arranged at a position corresponding to the fan on the fourth housing, the opening is configured to allow air to enter the fourth housing; the fourth housing further comprises a first baffle plate and a second baffle plate, the second baffle plate is mounted at the opening, a second ventilation opening is arranged on the second baffle plate, the first baffle plate is rotatably connected to the second baffle plate, and a first ventilation opening is arranged on the first baffle plate.

13. The temperature control system for the grill according to claim 12, wherein the first baffle plate is equipped with a second rotating shaft, one end of the second rotating shaft is equipped with a latch block, the second baffle plate is equipped with a second shaft hole, the second rotating shaft is rotatably arranged within the second shaft hole, and the latch block is clamped on an outer side of the second shaft hole to prevent the second rotating shaft from falling out of the second shaft hole.

14. The temperature control system for the grill according to claim 13, wherein a plurality of first protruding strips are arranged on the first baffle plate surrounding the second rotating shaft, correspondingly, a plurality of protruding dots are arranged on the second baffle plate surrounding the second shaft hole, when the first baffle plate abuts against the second baffle plate, the protruding dot can be clamped in a gap of the first protruding strip to prevent the first baffle plate and the second baffle plate from rotating relatively; and a plurality of second protruding strips are arranged on an outer side wall of the first baffle plate.

15. The temperature control system for the grill according to claim 11, wherein the fan further comprises a horizontal bar and an elastic member arranged at the air outlet, two ends of the horizontal bar are detachably connected to a side wall at the air outlet, the elastic member is rotatably arranged on the horizontal bar; the elastic member comprises two supporting rods and a spring portion, and the two supporting rods have an opening and closing angle between them.

16. The temperature control system for the grill according to claim 2, wherein the control module further comprises a display screen, a first button, a second button, a third button and a fourth button arranged on the second housing, the display screen, the first button, the second button, the third button and the fourth button are electrically connected to the second control main board respectively, and the display screen is configured to display temperature information; the first button is configured to control power on and off of the main unit, the second button is configured to control the on/off state of the fan, the third button is configured to switch a temperature display unit on the display screen, and the fourth button is configured to control switching between a temperature signal of the probe thermometer and a temperature signal of the temperature measurement module on the display screen.

17. A main unit for a temperature control system of a grill, wherein the main unit is configured to be mounted on the grill, a fan is positioned corresponding to an intake port of the grill to adjust an intake volume for controlling fuel combustion, and the main unit and the fan are in communication; the main unit comprises a control module and a temperature measurement module, the temperature measurement module is configured to detect an air ambient temperature of the grill and transmit a first temperature signal to the control module,
 wherein the temperature measurement module comprises a first housing, the first housing is equipped with a raised base, and a side wall of the base is equipped with a latch block; the control module comprises a second housing, a sliding groove used in cooperation with the latch block is arranged on a side wall of the second housing, the sliding groove comprises an opening and a fixed end, the second housing is positioned within the base, with the latch block aligned with the sliding groove, the latch block enters the sliding groove from the opening, and by rotating the second housing, the latch block slides to the fixed end, locking the second housing with the first housing; and rotating the second housing causes the latch block slide out from the opening, thus detaching the second housing from the first housing,
 wherein the temperature measurement module further comprises a first signal reception board arranged inside the first housing, a plurality of first pogo pins connected to the first signal reception board and a first temperature sensor configured to monitor a temperature, one end of the first temperature sensor is fixedly connected to the first housing, the other end of the first temperature sensor is arranged an outer side of the first housing, and the first temperature sensor is electrically connected to the first signal reception board; the control module further comprises a plurality of second pogo pins, and after the second housing is locked with the first housing, the second pogo pin abuts against the first pogo pin; and the first temperature sensor is made of a platinum resistance material.

18. A fan for a temperature control system of a grill, wherein the fan is positioned corresponding to an intake port of the grill to adjust an intake volume for controlling fuel combustion, the fan and a main unit are in communication either by wired means or by wireless means; the main unit is configured to get an air ambient temperature of the grill and control power of the fan or its on/off state based on the air ambient temperature of the grill,
 wherein the fan comprises a housing and a wireless signal board arranged inside the housing, and the wireless signal board is configured to receive a wireless signal from the main unit, wherein the fan further comprises a fan blade arranged inside the housing, the housing is equipped with an accommodating groove, an air duct and an air outlet, and the accommodating groove, the air duct and the air outlet are connected in sequence;

wherein the fan further comprises a horizontal bar and an elastic member arranged at the air outlet, two ends of the horizontal bar are detachably connected to a side wall at the air outlet, the elastic member is rotatably arranged on the horizontal bar; the elastic member comprises two supporting rods and a spring portion, and the two supporting rods have an opening and closing angle between them.

\* \* \* \* \*